(12) United States Patent
Masuda

(10) Patent No.: US 10,578,426 B2
(45) Date of Patent: Mar. 3, 2020

(54) OBJECT MEASUREMENT APPARATUS AND OBJECT MEASUREMENT METHOD

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 15/967,791

(22) Filed: May 1, 2018

(65) Prior Publication Data

US 2018/0245909 A1    Aug. 30, 2018

Related U.S. Application Data

(63) Continuation of application No. PCT/JP2016/083123, filed on Nov. 8, 2016.

(30) Foreign Application Priority Data

Nov. 27, 2015 (JP) ................................. 2015-231878

(51) Int. Cl.
*G01B 11/08* (2006.01)
*G06T 7/62* (2017.01)
(Continued)

(52) U.S. Cl.
CPC ............ *G01B 11/08* (2013.01); *G01B 11/026* (2013.01); *G01B 11/14* (2013.01); *G01B 11/26* (2013.01);
(Continued)

(58) Field of Classification Search
None
See application file for complete search history.

(56) References Cited

U.S. PATENT DOCUMENTS

2007/0029491 A1  2/2007 Olden et al.
2012/0140063 A1  6/2012 Shimada et al.
(Continued)

FOREIGN PATENT DOCUMENTS

CN   2893643 Y    4/2007
CN  101387499 A   3/2009
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/083123, dated Jun. 7, 2018, with an English translation of the Written Opinion.
(Continued)

*Primary Examiner* — Michael J Hess
(74) *Attorney, Agent, or Firm* — Birch, Stewart, Kolasch & Birch, LLP

(57) ABSTRACT

A first angle α formed between a direction normal to a white board (100) that is disposed along a plurality of reinforcing bars (2) and an imaging direction of a camera (200) and a second angle β indicating the direction of the reinforcing bar 2 which is a measurement target with respect to the imaging direction of the camera (200) are detected. In addition, a first distance D1 between the camera (200) and the white board (100) is measured by a laser distance meter provided in the camera (200). The amount of deviation D2 of the reinforcing bar (2) in the imaging direction of the camera (200) with respect to the first distance D1 is calculated on the basis of the measured first distance D1, the detected first angle α, and the detected second angle β.

14 Claims, 17 Drawing Sheets

(51) Int. Cl.
*G06T 7/521* (2017.01)
*G01B 11/26* (2006.01)
*G01C 3/08* (2006.01)
*G01B 11/14* (2006.01)
*G01B 11/02* (2006.01)
*G01C 11/00* (2006.01)

(52) U.S. Cl.
CPC .............. *G01C 3/08* (2013.01); *G01C 11/00* (2013.01); *G06T 7/521* (2017.01); *G06T 7/62* (2017.01)

(56) References Cited

U.S. PATENT DOCUMENTS

| | | | | |
|---|---|---|---|---|
| 2013/0096873 | A1* | 4/2013 | Rosengaus | G01C 15/002 702/151 |
| 2014/0226897 | A1 | 8/2014 | Masuda | |
| 2014/0368373 | A1* | 12/2014 | Crain | G01S 5/02 342/5 |
| 2015/0097828 | A1* | 4/2015 | Miller | G01C 15/002 345/420 |
| 2017/0108456 | A1* | 4/2017 | Alizadeh | C04B 40/0007 |

FOREIGN PATENT DOCUMENTS

| | | |
|---|---|---|
| CN | 102575933 A | 7/2012 |
| CN | 103284324 A | 9/2013 |
| CN | 103890541 A | 6/2014 |
| JP | 6-186036 A | 7/1994 |
| JP | 2010-266202 A | 11/2010 |
| JP | 2011-38944 A | 2/2011 |
| JP | 2012-67462 A | 4/2012 |
| JP | 2014-21067 A | 2/2014 |

OTHER PUBLICATIONS

International Search Report and English translation (Form PCT/ISA/210) for Application No. PCT/JP2016/083123, dated Jan. 31, 2017.

PCT Communication in Cases for Which No Other Form is Applicable (Form PCT/IB/345) for Application No. PCT/JP2016/083123, dated Jun. 29, 2018.

Chinese Office Action and Search Report for counterpart Chinese Application No. 201680062724.6, dated Sep. 29, 2019, with English translation.

* cited by examiner

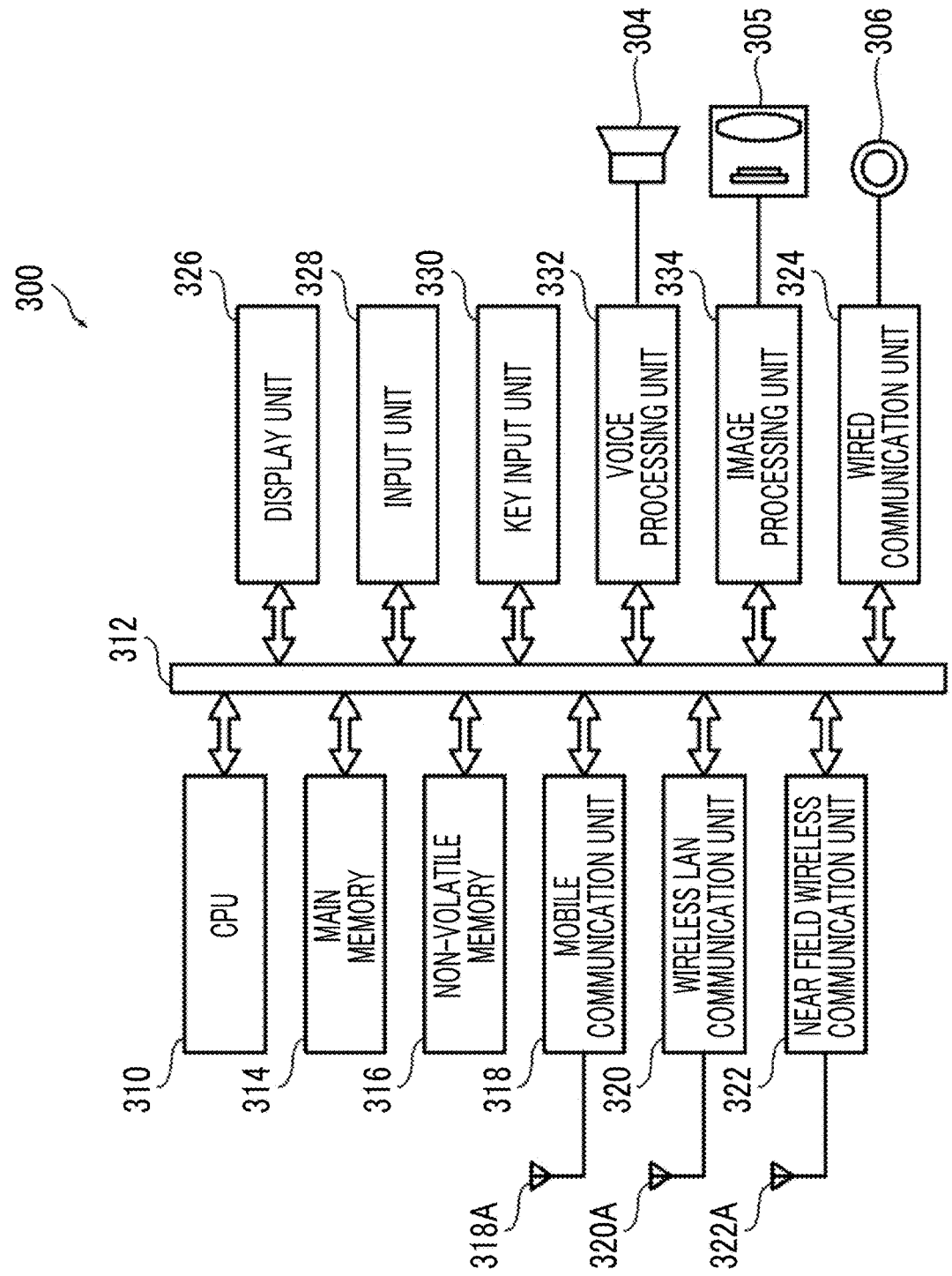

OBJECT MEASUREMENT APPARATUS AND OBJECT MEASUREMENT METHOD

CROSS-REFERENCE TO RELATED APPLICATIONS

The present application is a Continuation of PCT International Application No. PCT/JP2016/083123 filed on Nov. 8, 2016 claiming priority under 35 U.S.C § 119(a) to Japanese Patent Application No. 2015-231878 filed on Nov. 27, 2015. Each of the above applications is hereby expressly incorporated by reference, in their entirety, into the present application.

BACKGROUND OF THE INVENTION

1. Field of the Invention

The present invention relates to an object measurement apparatus and an object measurement method, and more particularly, to an object measurement apparatus and an object measurement method that measure the diameter of a columnar or cylindrical object in the inspection of the object.

2. Description of the Related Art

In the construction of a structure with reinforcing bars which are cylindrical objects, bar arrangement inspection is performed in order to ensure construction quality. The bar arrangement inspection is to inspect whether the installed reinforcing bars are arranged according to a bar arrangement drawing. A method using a photogrammetry technique has been known as one of the bar arrangement inspection methods.

For example, JP2010-266202A discloses a method which captures an image of reinforcing bars and a dedicated measurement jig having a reference point for photogrammetry, analyzes the obtained image, and measures the diameter of the reinforcing bars or a space between the reinforcing bars.

In addition, JP2012-67462A discloses a method which calculates the diameter of a reinforcing bar with high accuracy. In this method, a background bar with a marker is provided behind a reinforcing bar, a camera captures an image of the reinforcing bar, the diameter Wmk of the reinforcing bar is calculated from the length of each pixel of the image and the number of pixels in the image in which the reinforcing bar is projected to the background bar, and a distance LtkR from the camera to the right end of the reinforcing bar projected to the background bar and a distance LtkL from the camera to the left end of the reinforcing bar are calculated. Since the cross section of the reinforcing bar is an inscribed circle of a triangle having the calculated lengths Wmk, LtkR and LtkL as the lengths of three sides, the actual diameter Rk of the reinforcing bar is calculated from the diameter of the inscribed circle.

SUMMARY OF THE INVENTION

In the method disclosed in JP2010-266202A, the dedicated measurement jig needs to be included in the image. Therefore, the method has the disadvantage that versatility is low.

In a case in which an image of a plurality of reinforcing bars arranged one surface of a reinforcing bar assembly is captured with the plurality of reinforcing bars inclined and the diameter of the reinforcing bars and the space between the reinforcing bars are measured, there is a problem in measuring the diameter of the reinforcing bars. Since the reinforcing bar has a substantially cylindrical shape, the reinforcing bar is not seen to be thin in the image depending on the viewing angle unlike the plane. Therefore, in a case in which the reinforcing bar is corrected on the basis of the imaging angle similarly to the plane, there is a problem that the measured diameter of the reinforcing bar is greater than the actual diameter of the reinforcing bar.

This will be described with reference to FIG. 17. In a case in which an image of a plane 4 and a cylinder 6 is captured with the plane 4 and the cylinder 6 inclined, the length of the plane 4 corresponding to the diameter of the cylinder 6 is less than the diameter of the cylinder 6 in the image as represented by a one-dot chain line, but the size of the cylinder 6 is equal to that in a front view in the image as represented by a solid line.

Therefore, in a case in which the method disclosed in JP2010-266202A which measures the diameter of the reinforcing bar with a substantially cylindrical shape while defining that the reinforcing bar with a substantially cylindrical shape is in the same plane as the dedicated measurement jig is used, an error occurs in the measurement result.

The method disclosed in JP2012-67462A can measure the diameter of the reinforcing bar with high accuracy. However, in the method, the background bar with a marker having known dimensions needs to be provided behind the reinforcing bar which is the measurement target and, for example, the area of the triangle in which the reinforcing bar is inscribed and the sum of the lengths of three sides of the triangle is calculated to calculate the diameter of the circle (reinforcing bar) inscribed in the triangle. Therefore, there is a problem that calculation becomes complicated.

The invention has been made in view of the above-mentioned problems and an object of the invention is to provide an object measurement apparatus and an object measurement method that have high versatility and can measure the diameter of a columnar or cylindrical object with high accuracy.

In order to achieve the object, an aspect of the invention provides an object measurement apparatus that measures at least a diameter of a plurality of columnar or cylindrical objects, which are arranged on the same surface, of the diameter and a space between the plurality of objects. The object measurement apparatus comprises: a camera including an imaging lens and an image sensor; a distance acquisition unit that acquires a first distance between the camera and a measurement reference member which has a plane disposed along the plurality of objects; a first angle detection unit that detects a first angle formed between a direction normal to the plane of the measurement reference member and an imaging direction of the camera; a second angle detection unit that detects a second angle indicating a direction of an object which is a measurement target with respect to the imaging direction of the camera, on the basis of a position of the object which is the measurement target on the image sensor and a focal length of the imaging lens; a deviation amount calculation unit that calculates an amount of deviation of the object which is the measurement target with respect to the first distance in the imaging direction of the camera, on the basis of the first distance acquired by the distance acquisition unit, the first angle detected by the first angle detection unit, and the second angle detected by the second angle detection unit; and a diameter calculation unit that calculates the diameter of the object which is the measurement target, on the basis of a second distance obtained by adding the amount of deviation calculated by the deviation amount calculation unit to the first distance acquired by the distance acquisition unit, a magnitude of the diameter of the object which is the measurement target on the image sensor, and the focal length of the imaging lens.

According to the aspect of the invention, the measurement reference member having the plane disposed along the plurality of object is provided and the distance acquisition unit acquires the first distance between the measurement reference member and the camera. The first angle detection unit detects the first angle formed between the direction normal to the plane of the measurement reference member and the imaging direction of the camera. The second angle detection unit detects the second angle indicating the direction of the object which is the measurement target with respect to the imaging direction of the camera. Then, the deviation amount calculation unit calculates the amount of deviation of the object which is the measurement target with respect to the first distance in the imaging direction of the camera, on the basis of the acquired first distance, the detected first angle, and the detected second angle. The diameter calculation unit adds the amount of deviation to the first distance to calculate the second distance (a distance obtained by correcting the first distance with the amount of deviation) and calculates the diameter of the object which is the measurement target, on the basis of the calculated second distance, the magnitude of the diameter of the object which is the measurement target on the image sensor, and the focal length of the imaging lens. In a case in which the image of the object which is the measurement target is captured with the object inclined, the first distance between the measurement reference member and the camera acquired by the distance acquisition unit is corrected on the basis of the direction (second angle) of the object which is the measurement target. However, the object has a substantially cylindrical shape and is not seen to be thin in the image depending on the viewing angle, unlike the plane. Therefore, it is possible to measure the diameter of the object with high accuracy, without performing the same measurement (correction) as that in a case in which the image of the plane is captured with the plane inclined.

According to another aspect of the invention, in the object measurement apparatus, preferably, the distance acquisition unit is a distance meter provided in the camera.

According to still another aspect of the invention, in the object measurement apparatus, preferably, the distance meter is a laser distance meter. Since the laser distance meter measures the distance from the camera to one point on the measurement reference member, the distance in the same direction as the imaging direction (optical axis direction) of the camera is measured.

According to yet another aspect of the invention, in the object measurement apparatus, the distance acquisition unit calculates the first distance on the basis of a known size specified by the measurement reference member, a size on the image sensor which corresponds to the known size, the focal length of the imaging lens, and the first angle detected by the first angle detection unit.

According to still yet another aspect of the invention, in the object measurement apparatus, preferably, the measurement reference member is a plate-shaped member that has a parallelogram shape, a regular polygon shape, or a perfect circle shape as an outer shape. The outer shape of the plate-shaped member is capable of calculating the angle (first angle) between the direction normal to the measurement reference member and the imaging direction of the camera. The measurement reference may be, for example, the outline of the measurement reference member or a pattern in the measurement reference member. For example, in a case in which a flat plate with a rectangular shape is used as the measurement reference member, the outline of the flat plate can be used as the measurement reference. In addition, in a case in which an object having a pattern including a parallelogram, a regular polygon, or a perfect circle on the plane is used as the measurement reference member, the pattern on the plane can be used as the measurement reference. The measurement reference may be a plurality of points in addition to a pattern and a line. For example, four points indicating the vertices of a parallelogram can be used as the measurement reference.

According to yet still another aspect of the invention, in the object measurement apparatus, preferably, the measurement reference member is a black board or a white board for construction. Since the white board or the black board has a rectangular shape (parallelogram), the white board or the black board has the function of the measurement reference member. In addition, the image of the white board or the black board for construction on which an object and information for specifying, for example, the position of the object are written is captured at the same time as the image of the object is captured. In a case in which the white board or the black board for construction is used as the measurement reference member, there is an advantage that it is not necessary to prepare a special measurement reference member and it is possible to achieve measurement with high versatility.

According to still yet another aspect of the invention, in the object measurement apparatus, preferably, the first angle detection unit detects the first angle on the basis of position coordinates of a plurality of feature points of the measurement reference member on the image sensor and a relative positional relationship between the plurality of feature points of the measurement reference member in a real space.

According to yet still another aspect of the invention, in the object measurement apparatus, in a case in which the first distance is D1, the amount of deviation is D2, the first angle is α, and the second angle is β, the deviation amount calculation unit calculates the amount of deviation D2 using the following expression:

$$D2 = D1 \cdot \tan\beta / \{\tan(90° - \alpha) - \tan\beta\}.$$

According to still yet another aspect of the invention, in the object measurement apparatus, in a case in which the first distance is D1, the amount of deviation is D2, a magnitude of the diameter of the object which is the measurement target on the image sensor is φ, the focal length of the imaging lens is f, and the diameter of the object which is the measurement target is Φ, the diameter calculation unit calculates the diameter Φ of the object using the following expression:

$$\Phi = (D1 + D2) \cdot \phi / f.$$

According to yet still another aspect of the invention, in the object measurement apparatus, preferably, the deviation amount calculation unit calculates an amount of deviation of two objects, between which a space is to be measured, with respect to the first distance in the imaging direction of the camera on the basis of the first distance acquired by the distance acquisition unit, the first angle detected by the first angle detection unit, and the second angle of each of the two objects detected by the second angle detection unit. Preferably, the object measurement apparatus further comprises a space calculation unit that calculates the space between the two objects on the basis of the first distance, the amount of deviation of the two objects, the first angle, the focal length of the imaging lens, and a space between the two objects on the image sensor.

According to this aspect, it is possible to calculate the space between the objects in addition to the diameter of the object. Here, the space between the objects varies depending on the viewing angle, unlike the space between objects with a substantially cylindrical shape. Therefore, the first angle corresponding to the viewing angle is also used to calculate the space between two objects.

According to still yet another aspect of the invention, in the object measurement apparatus, in a case in which the first distance is D1, an average amount of deviation of the two objects is D3, the first angle is α, the focal length of the imaging lens is f, the space between two objects on the image sensor is s, and the space between two objects is S, the space calculation unit calculates the space S between the two objects using the following expression:

$$S=(D1+D3) \cdot s/(f\cos \alpha).$$

According to yet still another aspect of the invention, preferably, the object measurement apparatus further comprises a computer that is communicable with the camera. Preferably, the computer receives, from the camera, an image which is captured by the camera in a state in which at least the measurement reference member is included in one screen and functions as the first angle detection unit, the deviation amount calculation unit, and the diameter calculation unit. According to this aspect, the computer that is communicable with the camera is provided and the computer implements the functions of the first angle detection unit, the deviation amount calculation unit, and the diameter calculation unit.

According to still yet another aspect of the invention, in the object measurement apparatus, preferably, the computer further comprises a display unit that displays the image captured by the camera.

Yet still another aspect of the invention provides an object measurement method that measures at least a diameter of a plurality of columnar or cylindrical objects, which are arranged on the same surface, of the diameter and a space between the plurality of objects. The object measurement method comprises: a step of capturing an image of the plurality of objects and a measurement reference member that has a plane disposed along the plurality of objects at the same time using a camera comprising an imaging lens and an image sensor; a step of acquiring a first distance between the camera and the measurement reference member; a step of detecting a first angle formed between a direction normal to the plane of the measurement reference member and an imaging direction of the camera on the basis of the captured image; a step of detecting a second angle indicating a direction of an object which is a measurement target with respect to the imaging direction of the camera, on the basis of a position of the object which is the measurement target on the image sensor and a focal length of the imaging lens; a step of calculating an amount of deviation of the object which is the measurement target with respect to the first distance in the imaging direction of the camera, on the basis of the acquired first distance, the detected first angle, and the detected second angle; and a step of calculating the diameter of the object which is the measurement target, on the basis of a second distance obtained by adding the calculated amount of deviation to the acquired first distance, a magnitude of the diameter of the object which is the measurement target on the image sensor, and the focal length of the imaging lens.

According to the invention, it is possible to measure the diameter of a columnar or cylindrical object with high accuracy and to achieve measurement with high versatility.

BRIEF DESCRIPTION OF THE DRAWINGS

FIG. 6 is a block diagram illustrating the system configuration of the computer.

DESCRIPTION OF THE PREFERRED EMBODIMENTS

Hereinafter, preferred embodiments of an object measurement apparatus and an object measurement method according to the invention will be described with reference to the accompanying drawings.

[Configuration of Object Measurement Apparatus]

Figure 1:
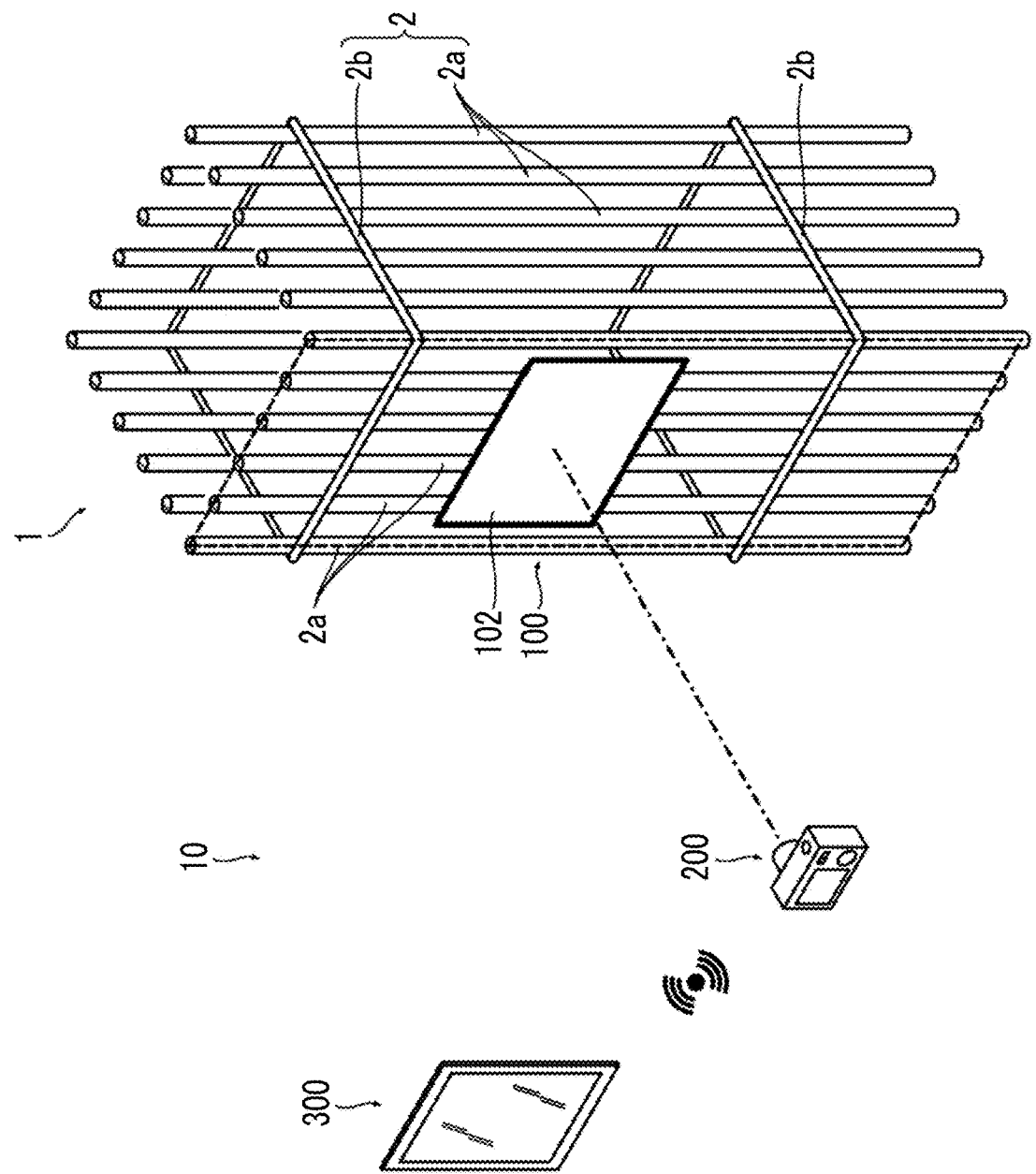
FIG. 1 is a diagram illustrating the overall configuration of an embodiment of an object measurement apparatus according to the invention.

FIG. 1 is a diagram illustrating the overall configuration of an embodiment of the object measurement apparatus according to the invention and illustrates a case in which the bar arrangement of bars which are one type of columnar or cylindrical objects to be measured is measured.

An object measurement apparatus 10 measures the diameter of reinforcing bars which are a plurality of columnar or cylindrical objects provided on the same surface and a space between the reinforcing bars. FIG. 1 illustrates a case in which the diameter of reinforcing bars that are provided in one surface of a reinforcing bar assembly 1 with a rectangular prism shape and a space between the reinforcing bars are measured. The reinforcing bar assembly 1 is filled with concrete to form a reinforced concrete column having a rectangular shape in a cross-sectional view.

<<Reinforcing Bar Assembly>>

As illustrated in FIG. 1, the reinforcing bar assembly 1 includes a plurality of main bars 2a and a plurality of tie bars 2b. The main bars 2a are arranged in a rectangular shape. The tie bars 2b are arranged so as to surround the main bars 2a arranged in the rectangular shape. The main bars 2a are provided so as to be vertical to an installation surface. The tie bars 2b are provided so as to be perpendicular to the main bars 2a.

Hereinafter, the main bar 2a and the tie bar 2b are generically referred to as reinforcing bars 2. In FIG. 1, the reinforcing bar 2 has a cylindrical shape. However, in practice, the reinforcing bar 2 has joints arranged at regular intervals and has a substantially cylindrical shape as a whole. In addition, the diameter of the reinforcing bar 2 means the nominal diameter of a portion without a joint in the reinforcing bar 2 or the outside diameter of the portion without a joint.

The object measurement apparatus 10 includes a camera 200 provided with a laser distance meter and a tablet computer 300. The object measurement apparatus 10 captures the image of the reinforcing bars 2 which are a measurement target and a white board 100 for construction on one screen with the camera 200, analyzes the obtained image with the computer 300, and measures the diameter of the reinforcing bars included in the image and the space between the reinforcing bars.

<White Board>

The white board 100 is an example of a measurement reference member. The white board 100 is a flat metal plate (plate-shaped member) with a rectangular (parallelogram) outline. The white board 100 has a white display surface 102 as the front surface. The display surface 102 is configured such that information can be written on the display surface 102 by a marker. In addition, the display surface 102 is configured such that the information written on the display surface 102 can be erased by a white board eraser. Information required for object inspection (in this embodiment, since the object as an inspection target is bar arrangement, the object inspection is referred to as bar arrangement inspection), such as an inspection target, is written on the display surface 102 of the white board 100. For example, a building name, the type of column, and the position of a column are written on the white board 100.

The white board 100 has a magnet (not illustrated) provided on the rear surface. The white board 100 can be closely attached to the reinforcing bars by the magnetic force of the magnet.

<Camera>

Figure 2:
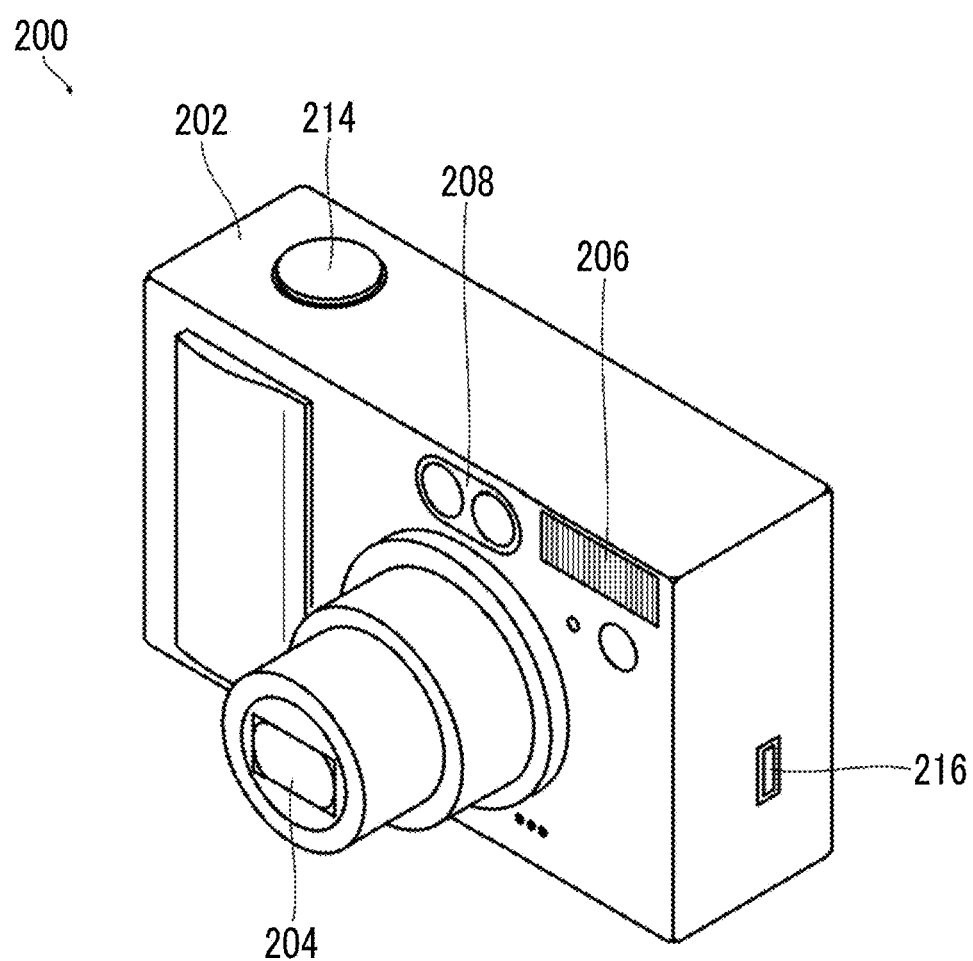
FIG. 2 is a front perspective view illustrating the external configuration of a camera.
Figure 3:
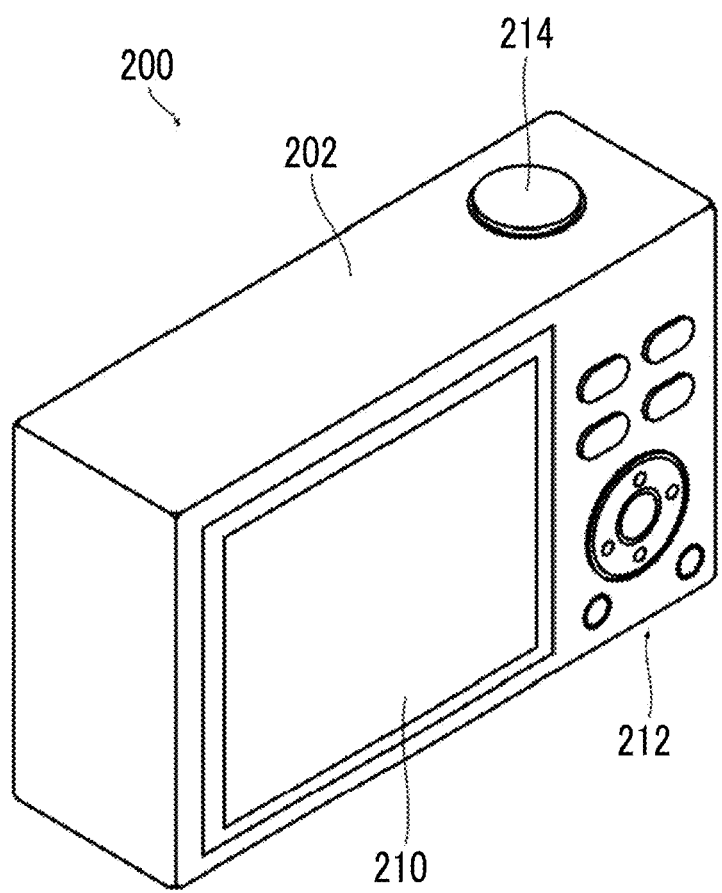
FIG. 3 is a rear perspective view illustrating the external configuration of the camera.

FIG. 2 is a front perspective view illustrating the external configuration of the camera. FIG. 3 is a rear perspective view illustrating the external configuration of the camera.

The camera 200 is a lens-integrated digital camera into which a laser distance meter is incorporated. The camera 200 captures an optical image of an object through an imaging lens using an image sensor and records the captured image as digital data. The laser distance meter is an example of a distance meter, irradiates a target object with laser light and measures the distance to a point on the target object irradiated with the laser light from the camera 200 using reflected light. The laser distance meter emits laser light in the same direction as an imaging direction (optical axis direction) of the camera 200 and measures the distance to the white board 100 which is a target object in the optical axis direction of the camera 200 in this example. The laser distance meter corresponds to a distance acquisition unit that acquires the distance between the camera and the measurement reference member.

As illustrated in FIGS. 2 and 3, the camera 200 has a camera body 202 with a flat box shape. For example, an imaging lens 204, a strobe 206, and a distance measurement window 208 are provided on the front surface of the camera body 202. A monitor 210 and an operation unit 212 including a plurality of operation buttons are provided on the rear surface of the camera body 202. A shutter button 214 is provided on an upper surface of the camera body 202. An external connection terminal 216 is provided on one side surface of the camera body 202. A screw hole for a tripod and an openable battery cover (which are not illustrated) are provided on a lower surface of the camera body 202. A battery chamber for accommodating a battery and a memory card slot into which a memory card is inserted are provided inside the battery cover.

The imaging lens 204 is a prime lens with a fixed focal length. Therefore, the focal length of the imaging lens 204 is known. The imaging lens 204 is a combination of a plurality of lenses and some of the lenses are moved along the optical axis to adjust focus. In addition, the imaging lens 204 includes a stop and the amount of opening of the stop is adjusted to adjust the amount of light transmitted through the stop.

The distance measurement window 208 is a window through which laser light for distance measurement is emitted. The laser light for distance measurement is emitted in parallel to the optical axis of the imaging lens 204. The laser light emitted from the distance measurement window 208 is reflected from the target object and the reflected light is incident on the distance measurement window 208 and is used for measurement. It is preferable that the laser light for distance measurement is laser light in a visible light range. The use of the laser light in the visible light range makes it possible to visually check a measurement position.

The monitor 210 is a color liquid crystal display (LCD). The monitor 210 is used to reproduce and display the captured image and is also used as a graphical user interface (GUI) in a case in which various settings are set. In addition, when imaging is performed, the monitor 210 displays the image captured by the image sensor in real time and is used as an electronic finder.

The plurality of operation buttons forming the operation unit 212 include, for example, a power button, a menu button, a mode switching button, a cross button, a confirmation button, a cancel button, and a distance measurement button. The power button is used to turn on and off the camera 200. The menu button is used to call a menu screen to the monitor 210. The mode switching button is used to switch the mode of the camera 200 among an imaging mode, a playback mode, and a measurement mode. The cross button can be operated in four directions, that is, the up, down, left, and right directions. The cross button has predetermined functions that are allocated to each direction according to the state of the camera 200. For example, in the playback mode, a fast forwarding function is allocated to the right direction and a rewinding function is allocated to the left direction. In addition, the cross button has a function of moving a cursor in each direction in a case in which various settings are set. The confirmation button is used to command the confirmation of a process. The cancel button is used to command the cancellation of a process. The distance measurement button is used to command the execution of distance measurement by the laser distance meter.

The shutter button 214 is a button of a two-step stroke type including a so-called "halfway-pressed" step and a so-called "fully-pressed" step. In a case in which the shutter button 214 is pressed halfway, the camera 200 prepares for imaging. In a case in which the shutter button 214 is pressed fully, the camera 200 performs an imaging operation for recording.

The external connection terminal 216 is, for example, a universal serial bus (USB) terminal. The camera is connected to an external apparatus, such as a personal computer, by a cable through the external connection terminal 216 such that it can communicate with the external apparatus.

Figure 4:
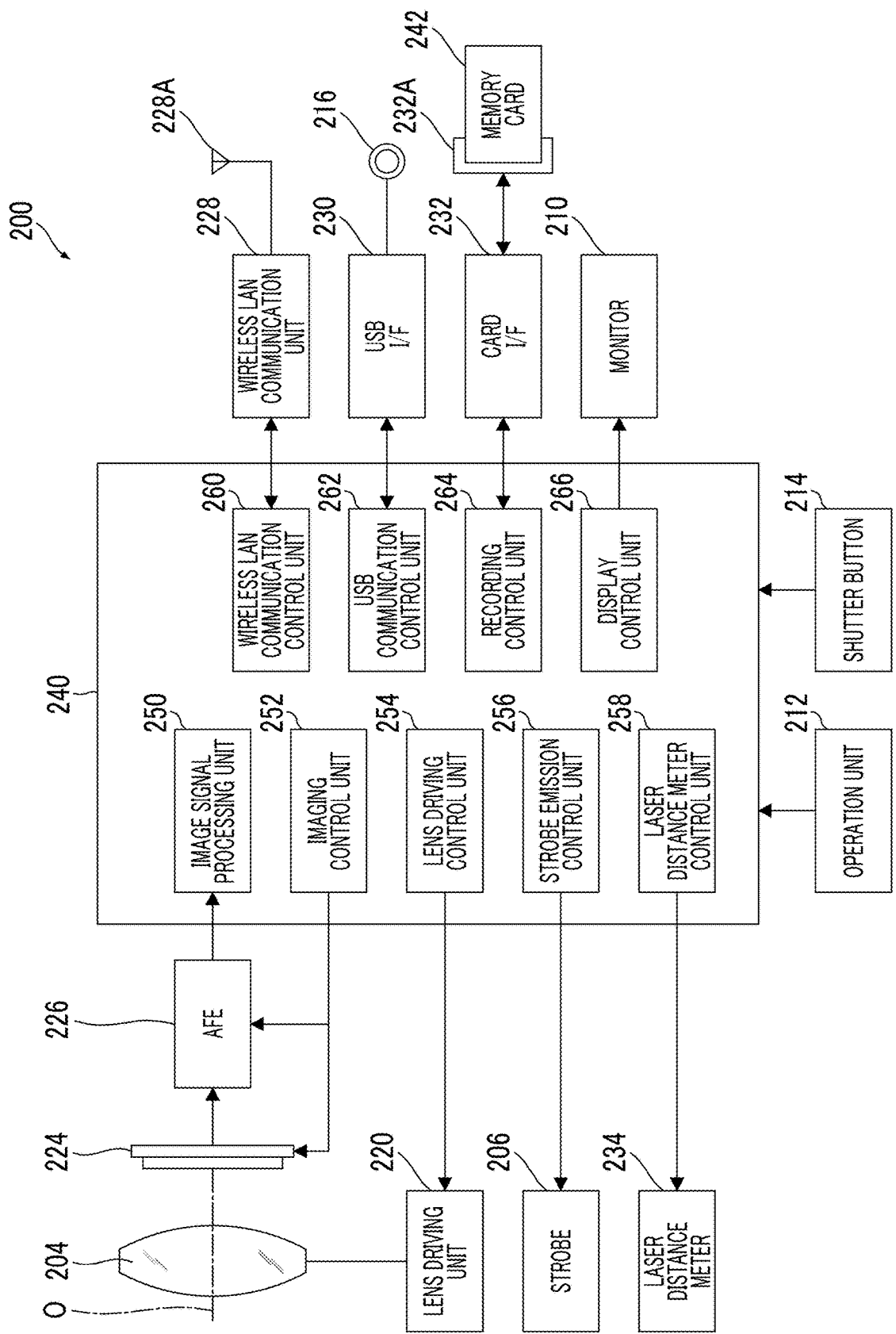
FIG. 4 is a block diagram illustrating the electrical configuration of the camera.

FIG. 4 is a block diagram illustrating the electrical configuration of the camera.

As illustrated in FIG. 4, the camera 200 includes, for example, a lens driving unit 220, an image sensor 224, an analog front end (AFE) 226, a wireless local area network (LAN) communication unit 228, a USB interface 230, a card interface 232, a laser distance meter 234, and a camera control unit 240.

The lens driving unit 220 drives a portion of the imaging lens 204 along the optical axis. In addition, the lens driving unit 220 increases and decreases the amount of opening of the stop provided in the imaging lens 204.

The image sensor 224 is a two-dimensional image sensor such as a charge coupled device (CCD) image sensor or a complementary metal oxide semiconductor (CMOS) image sensor. The image sensor 224 is provided on the optical axis of the imaging lens 204. Light transmitted through the imaging lens 204 is incident on a light receiving surface of the image sensor 224. Information about, for example, the number of pixels in the image sensor 224 and a pixel pitch is known.

The AFE 226 performs signal processing, such as noise removal, signal amplification, and analog/digital (A/D) conversion, for a signal (image signal) output from the image sensor 224 to generate a digital image signal.

The wireless LAN communication unit 228 performs wireless LAN communication based on a predetermined communication standard (for example, an IEEE802.11a/b/g/n standard (IEEE: The Institute of Electrical and Electronics Engineers, Inc.)) with a wireless LAN access point or an external apparatus that can perform wireless LAN communication through an antenna 228A.

The USB interface 230 performs USB communication based on a predetermined communication standard with an external apparatus that is connected to the camera by a cable through the external connection terminal 216 which is a USB terminal.

The card interface 232 reads and writes data from and to a memory card 242 that is inserted into a memory card slot 232A.

The laser distance meter 234 emits laser light and measures the distance to a point on the target object irradiated with the laser light from the camera 200 using reflected light. For the measurement principle of the laser distance meter, there are some methods (for example, a triangulation method and a phase difference distance measurement method). Any of the methods may be used. For example, in the case of the triangulation method, a light receiving element reads reflected light of the laser light emitted to the target object and the distance is measured on the principle of triangulation. In the case of the phase difference distance measurement method, a phase difference between projected laser light and reflected light is detected and the distance is measured.

The camera control unit 240 controls the overall operation of the camera 200 and performs predetermined signal processing. The camera control unit 240 is a microcomputer including a central processing unit (CPU) and a memory. The camera control unit 240 executes a predetermined program to function as, for example, an image signal processing unit 250, an imaging control unit 252, a lens driving control unit 254, a strobe emission control unit 256, a laser distance meter control unit 258, a wireless LAN communication control unit 260, a USB communication control unit 262, a recording control unit 264, and a display control unit 266.

The image signal processing unit 250 performs necessary signal processing for the digital image signal generated by the AFE 226 to generate predetermined image data (for example, image data including image data of a brightness signal (Y) and image data of a color difference signal (Cr, Cb)).

The imaging control unit 252 controls imaging by the image sensor 224.

The lens driving control unit 254 controls the focus of the imaging lens 204 through the lens driving unit 220 such that the imaging target is in focus. In addition, the lens driving control unit 254 controls the stop of the imaging lens 204 through the lens driving unit 220 such that imaging is performed with appropriate exposure.

The strobe emission control unit 256 controls the emission of the strobe 206 such that a strobe emits a predetermined amount of light in synchronization with imaging when the imaging is performed with the strobe.

The laser distance meter control unit 258 controls measurement by the laser distance meter 234.

The wireless LAN communication control unit 260 controls communication by a wireless LAN through the wireless LAN communication unit 228.

The USB communication control unit 262 controls communication by a USB through the USB interface 230.

The recording control unit 264 controls the reading and writing of data from and to the memory card 242 inserted into the memory card slot 232A through the card interface 232.

The display control unit 266 controls the display of the monitor 210.

In addition, the camera control unit 240 performs processes required for imaging and the measurement of the distance by the laser distance meter 234.

<Computer>

Figure 5B:
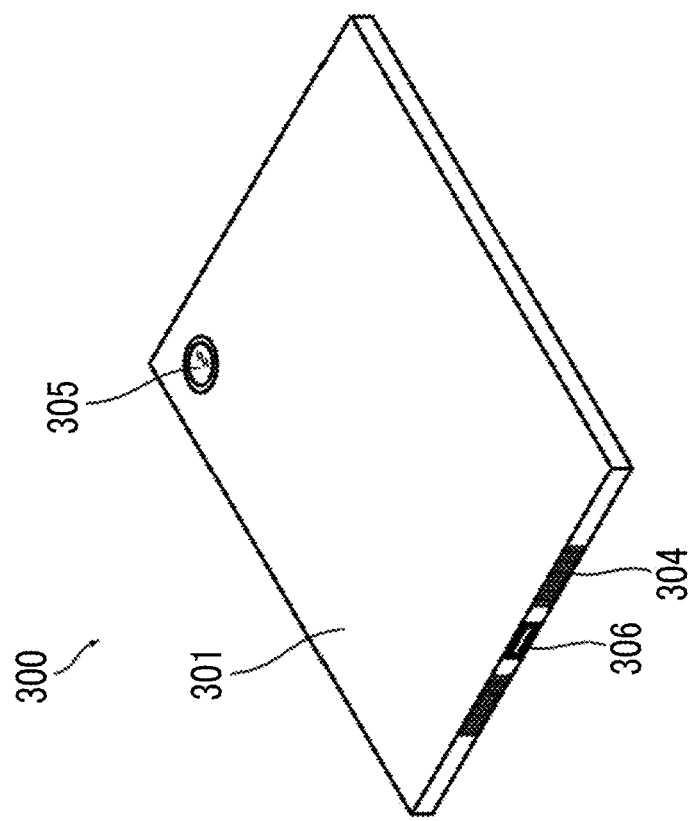
FIGS. 5A and 5B are perspective views illustrating the external configuration of a computer.
Figure 5A:
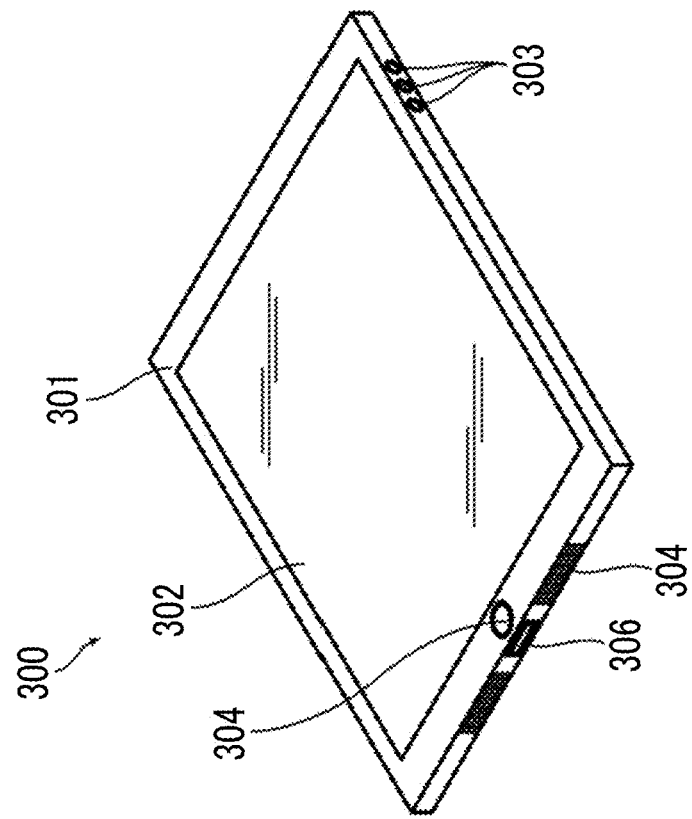

FIGS. 5A and 5B are perspective views illustrating the external configuration of the computer. FIG. 5A is a front perspective view and FIG. 5B is a rear perspective view.

As illustrated in FIGS. 5A and 5B, the computer 300 is a tablet computer. The computer 300 has a flat-plate-shaped housing 301 with a rectangular outline. For example, a touch panel display 302 that functions as a display unit and an input unit, operation buttons 303, a speaker 304, a built-in camera 305, and an external connection terminal 306 are provided in the housing 301.

FIG. 6 is a block diagram illustrating the system configuration of the computer.

As illustrated in FIG. 6, the computer 300 includes a CPU 310 that controls the overall operation of the computer 300. For example, a main memory 314, a non-volatile memory 316, a mobile communication unit 318, a wireless LAN communication unit 320, a near field communication unit 322, a wired communication unit 324, a display unit 326, an input unit 328, a key input unit 330, a voice processing unit 332, and an image processing unit 334 are connected to the CPU 310 through a system bus 312.

The CPU 310 reads out, for example, an operation program (an operating system (OS) and an application program operating on the OS) stored in the non-volatile memory 316 and structured data, develops the read operation program and data in the main memory 314, and executes the operation program to function as a control unit that controls the overall operation of the computer.

The main memory 314 is, for example, a random access memory (RAM) and functions as a work memory of the CPU 310.

The non-volatile memory 316 is, for example, a flash electrically erasable programmable read only memory (EEPROM) and stores the above-mentioned operation program or various kinds of structured data. In addition, the non-volatile memory 316 functions as a storage unit of the computer 300 and stores various kinds of data.

The mobile communication unit 318 transmits and receives data to and from the nearest base station (not illustrated) through an antenna 318A on the basis of a third-generation mobile communication system based on the International Mobile Telecommunication-2000 (IMT-2000) standard and a fourth-generation mobile communication system based on the International Mobile Telecommunications-Advanced (IMT-Advanced) standard.

The wireless LAN communication unit 320 performs wireless LAN communication based on a predetermined wireless LAN communication standard (for example, an IEEE802.11a/b/g/n standard) with a wireless LAN access point or an external apparatus that can perform wireless LAN communication through an antenna 320A.

The near field communication unit 322 transmits and receives data to and from another apparatus based on a Bluetooth (registered trademark) standard in the range of, for example, Class 2 (within a radius of about 10 m) through an antenna 322A.

The wired communication unit 324 performs communication based on a predetermined communication standard with an external apparatus that is connected to the computer by a cable through the external connection terminal 306. For example, the wired communication unit 324 performs USB communication.

The display unit 326 includes a color LCD panel that forms a display portion of the touch panel display 302 and a driving circuit for the color LCD panel and displays various kinds of information and images including the image received from the camera 200.

The input unit 328 forms a touch panel portion of the touch panel display 302. The input unit 328 is integrated with the color LCD panel by a transparent electrode. The input unit 328 generates two-dimensional position coordinate information corresponding to the user's touch operation and outputs the two-dimensional position coordinate information.

The key input unit 330 includes a plurality of operation buttons 303 provided in the housing 301 of the computer 300 and a driving circuit for the operation buttons 303.

The voice processing unit 332 converts digital voice data transmitted through the system bus 312 into analog voice data and outputs the analog voice data from the speaker 304.

The image processing unit 334 converts an analog image signal output from the built-in camera 305 including an imaging lens and an image sensor into a digital image signal, performs necessary signal processing for the digital image signal, and outputs the processed digital image signal.

<Various Functions of Computer>

The computer 300 executes a predetermined program to function as a first angle detection unit 350 and a measurement unit 352.

Figure 7:
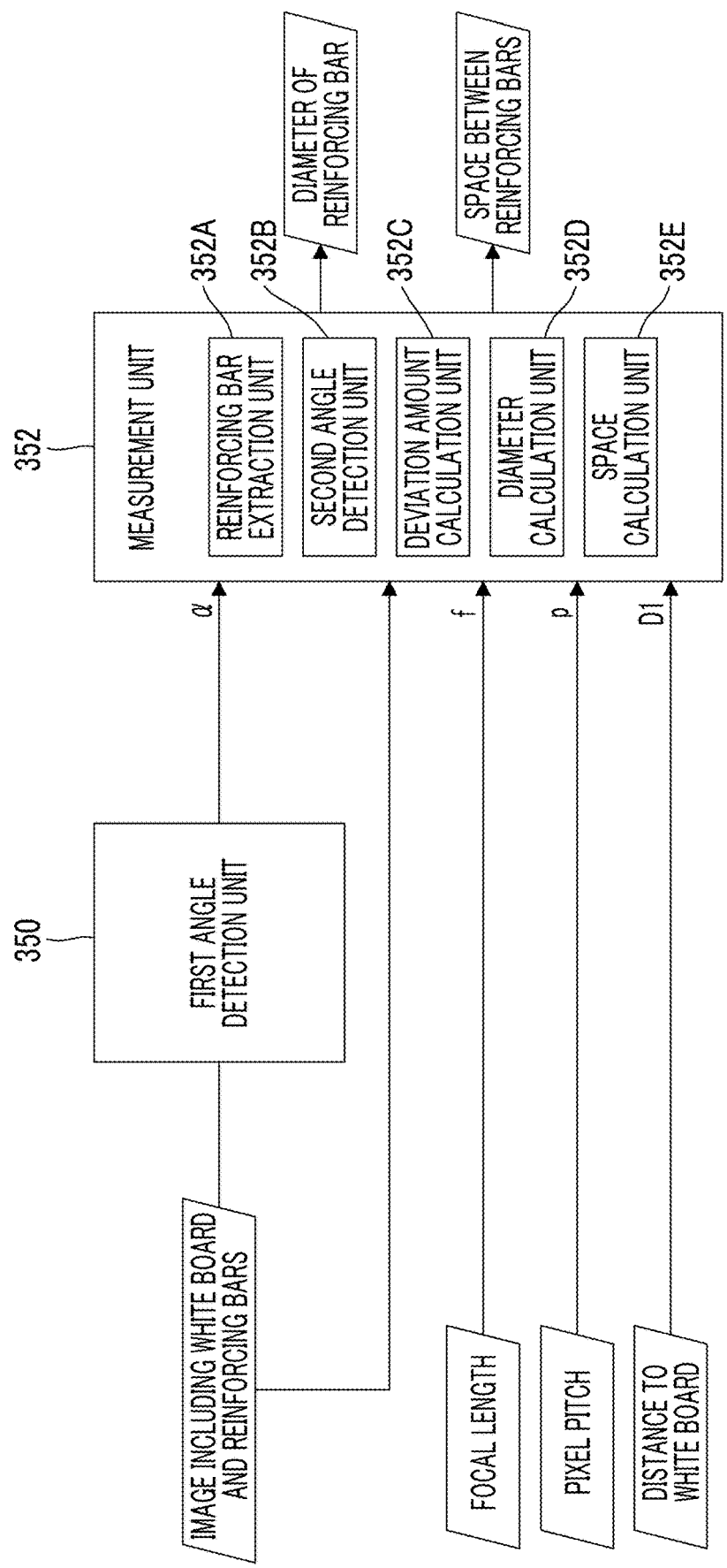
FIG. 7 is a block diagram illustrating functions implemented by the computer.

FIG. 7 is a block diagram illustrating the functions implemented by the computer.

<First Angle Detection Unit>

The first angle detection unit 350 analyzes image data of the image including the white board 100 and the reinforcing bars 2 and detects an angle (first angle) formed between a direction normal to the plane of the white board 100 and the imaging direction of the camera 200 (the optical axis direction of the imaging lens). The first angle is 0 degrees in a case in which the camera 200 captures the image of the white board 100 in front of (while facing) the white board 100.

The first angle detection unit 350 analyzes the image data and extracts the outline of the white board 100 which is a measurement reference. The outline is extracted by known outline extraction image processing.

The first angle detection unit 350 detects the first angle on the basis of the shape of the outline of the white board 100 (in this example, the coordinates of four corners of the white board 100).

Next, a method for detecting the first angle will be described.

Figure 8:
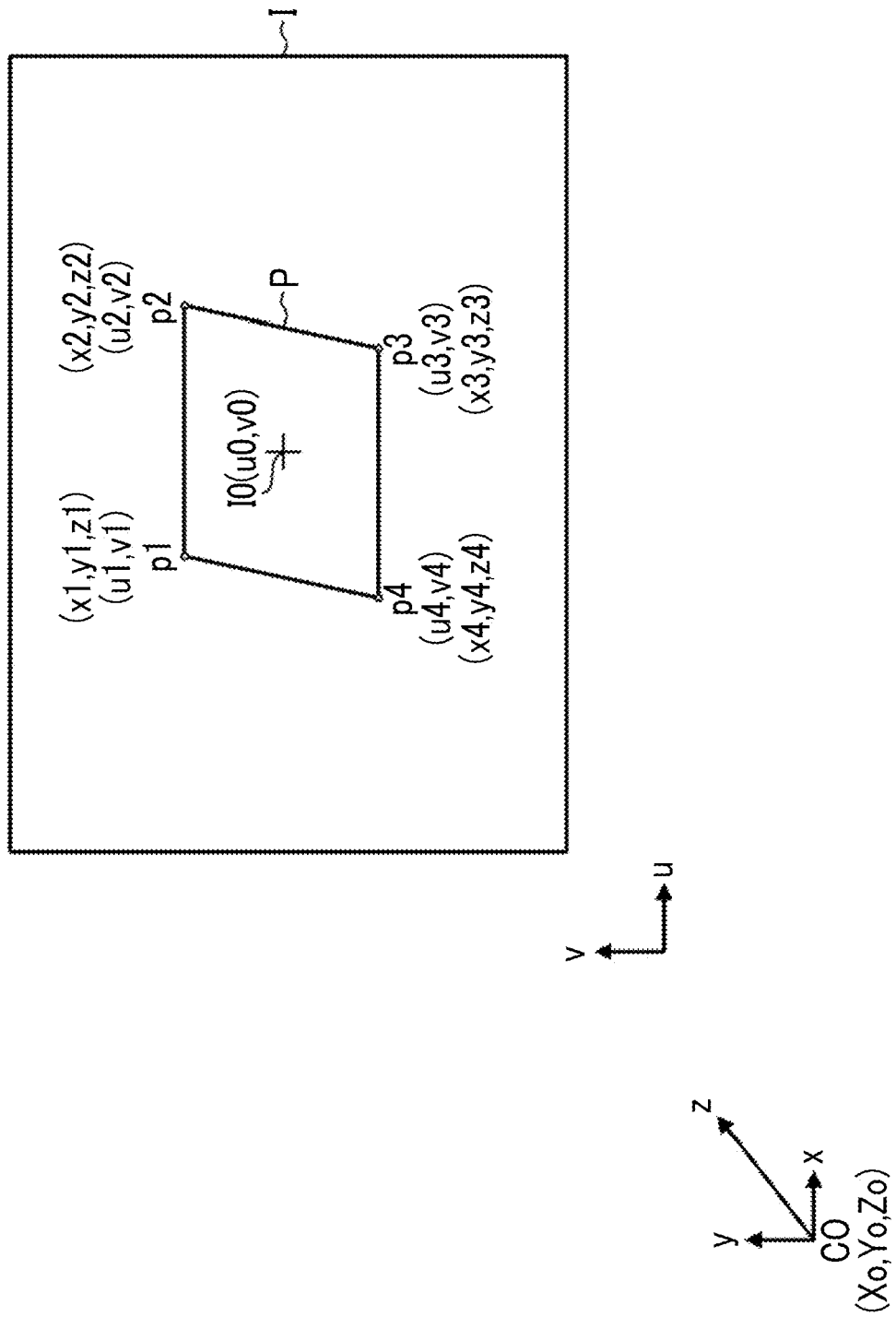
FIG. 8 is a conceptual diagram illustrating a method for detecting a first angle from the coordinates of four vertices of a parallelogram on an image in a case in which the image of a flat plate with a parallelogram shaped is captured.

FIG. 8 is a conceptual diagram used to describe a method for detecting the first angle from the coordinates of four vertices of a parallelogram on an image in a case in which the image of a flat plate with a parallelogram shape is captured. The white board 100 has a rectangular shape. However, since the rectangle is included in the parallelogram, the parallelogram will be described as an example in FIG. 8.

It is assumed that a captured image is I and the parallelogram extracted from the image I is P. In addition, it is assumed that four vertices (feature points) of the parallelogram P extracted from the image I are p1, p2, p3, and p4.

A two-dimensional coordinate system having a u-axis and a v-axis is set on the image I and it is assumed that the coordinates of the center of the set two-dimensional coordinate system is I0(u0, v0). In addition, it is assumed that the coordinates of the four vertices p1, p2, p3, and p4 of the parallelogram included in the image are (u1, v1), (u2, v2), (u3, v3), and (u4, v4).

In a case in which the focal length of the imaging lens included in the camera 200 is f, the position of the camera is the origin C0 and, the horizontal direction of the camera 200 is the x-axis, the vertical direction of the camera 200 is the y-axis, and the optical axis direction of the camera 200 is the z-axis, the vertices p1, p2, p3, and p4 in a three-dimensional space are represented as follows:

$$p1(x1=A(u1-u0), y1=A(v1-v0), z1=Af);$$

$$p2(x2=B(u2-u0), y2=B(v2-v0), z2=Bf);$$

$$p3(x3=C(u3-u0), y3=C(v3-v0), z3=Cf); \text{ and}$$

$$p4(x4=D(u4-u0), y4=D(v4-v0), z4=Df).$$

Here, four points of the parallelogram P having A to D as given constants are present at any positions in the three-dimensional space. In a case in which a figure formed by the four vertices p1, p2, p3, and p4 is a parallelogram, a vector p1p2=a vector p3p4 is established.

In a case in which an expression is created on the basis of the above, B/A, C/A, and D/A are calculated. Since A is unfixed, a magnitude and a distance are not determined. However, the direction of the parallelogram (the direction normal to the plane of the parallelogram) is calculated regardless of A. This is calculated regardless of whether four points on the image form the real parallelogram.

In a case in which A=1 is established, the calculated B/A, C/A, and D/A can be rewritten as B, C, and D, respectively, and it is possible to calculate the space coordinates of the four vertices p1, p2, p3, and p4 of the parallelogram in the three-dimensional space (a scale is unfixed).

In contrast, the equation of the plane can be represented as follows.

$$ax+by+cz+d=0 \quad \text{[Expression 1]}$$

Since the four vertices p1, p2, p3, and p4 of the parallelogram are points on the plane, [Expression 1] is satisfied.

The coordinates of three of the four vertices p1, p2, p3, and p4 are substituted into [Expression 1] and simultaneous equations are solved to calculate coefficients (a, b, and c) of the equation of the plane. The coefficients (a, b, and c) are a normal vector n (n=a, b, c) to the plane.

In a case in which the first angle formed between the direction normal to the plane and the imaging direction of the camera 200 (the z direction in the coordinate system) is a, the first angle α can be calculated from the normal vector n (n=(a, b, c)) by the following expression.

$$\alpha=\arccos(c/\sqrt{(a^2+b^2\pm c^2)}) \quad \text{[Expression 2]}$$

As such, it is possible to calculate the first angle α formed between the direction normal to the white board 100 and the imaging direction of the camera 200 when the image of the white board 100 is captured from the shape of the outline of the white board 100 extracted from the captured image.

<Measurement Unit>

Figure 9:
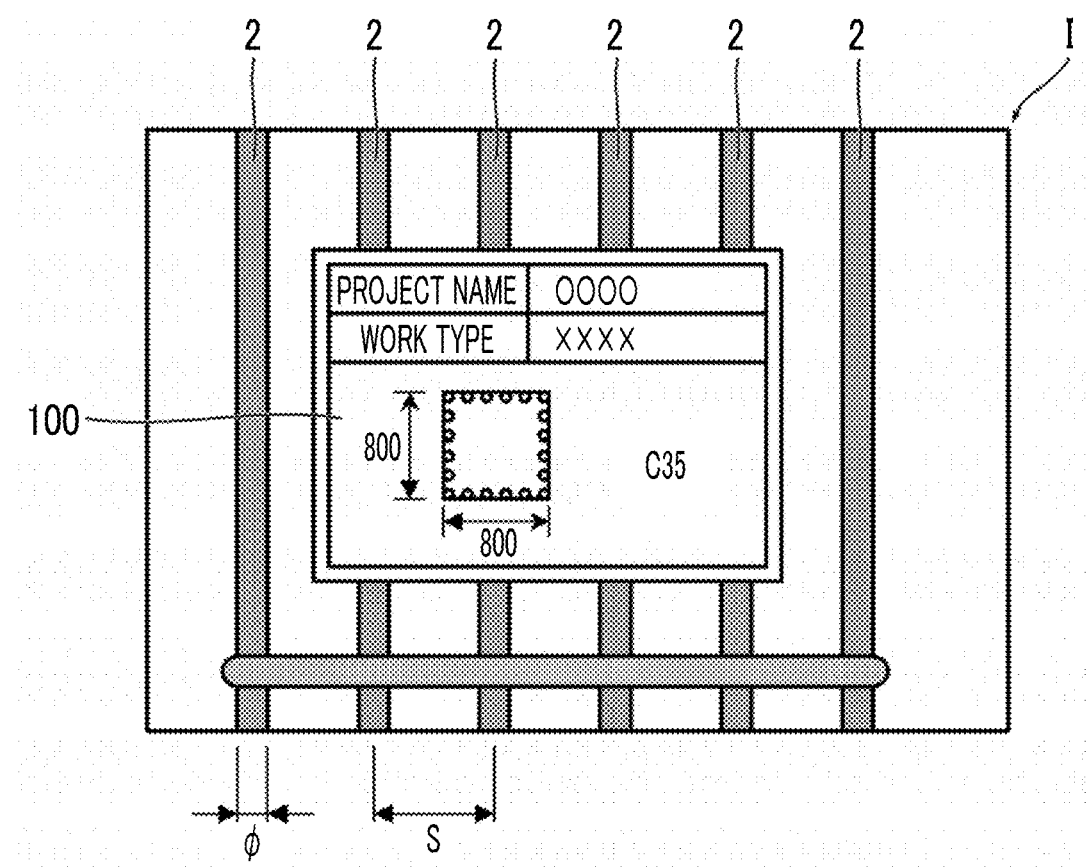
FIG. 9 is a diagram illustrating an example of the captured image.

FIG. 9 is a diagram illustrating an example of the captured image.

The image I includes the reinforcing bars 2 which are the measurement target and the white board 100. The measurement unit 352 measures the diameter of the reinforcing bars 2 which are the measurement target and the space between the reinforcing bars 2 (the space between adjacent reinforcing bars) from the image I.

The measurement unit 352 acquires image data of the image including the white board 100 and the reinforcing bars 2, information of the distance (first distance D1) measured by the laser distance meter 234 when the image is captured, information of the imaging direction (the first angle α) of the image, information of the direction (a second angle β which will be described below) of the reinforcing bars 2 which are the measurement target with respect to the imaging direction of the camera, information of the focal length f of the imaging lens 204, and information of the pixel pitch p of the image sensor 224 and measures a diameter Φ of each reinforcing bar included in the image and the space S between the reinforcing bars.

The measurement unit 352 includes a reinforcing bar extraction unit 352A, a second angle detection unit 352B, a deviation amount calculation unit 352C, a diameter calculation unit 352D, and a space calculation unit 352E.

The reinforcing bar extraction unit 352A analyzes the image and extracts the reinforcing bars 2 which are the measurement target from the image.

The second angle detection unit 352B detects an angle (second angle β) indicating the direction of the reinforcing bars 2 which are the measurement target with respect to the imaging direction of the camera 200.

Figure 10:
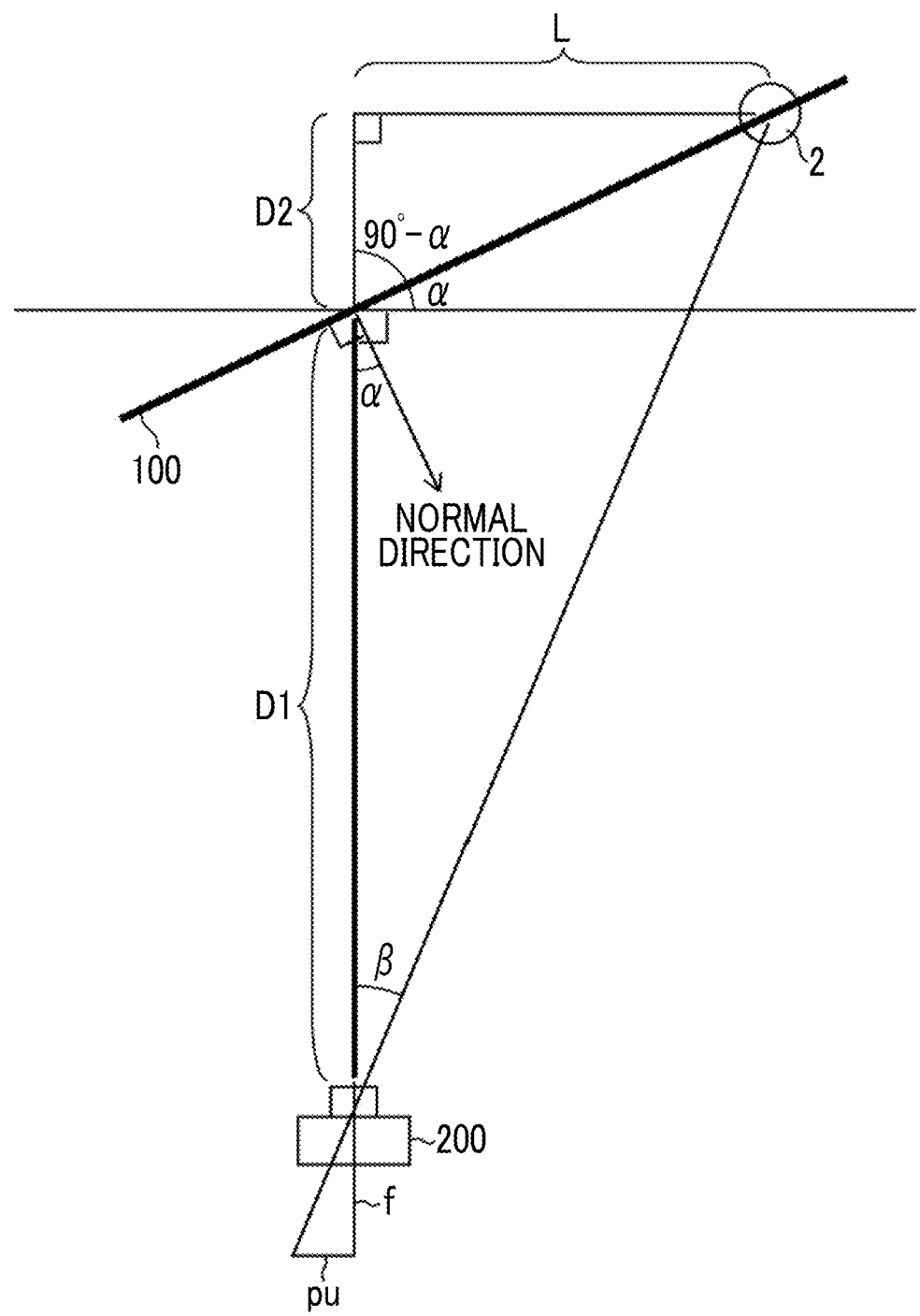
FIG. 10 is a diagram illustrating parameters required to measure (calculate) the diameter of reinforcing bars and a space between the reinforcing bars.

FIG. 10 is a diagram illustrating parameters required to measure (calculate) the diameter of the reinforcing bars 2 and the space between the reinforcing bars 2.

In a case in which the diameter of the reinforcing bar 2 illustrated in FIG. 10 is measured, the second angle detection unit 352B detects the angle (second angle β) indicating the direction of the reinforcing bar 2 with respect to the imaging direction (optical axis direction) of the camera 200 on the basis of the position coordinates of the reinforcing bar 2 on the image sensor 224.

Specifically, in a case in which the coordinates of the reinforcing bar 2 on the image sensor 224 (the coordinates in a case in which the position of the optical axis is the origin) are u, the pixel pitch of the image sensor 224 is p (constant), and the focal length of the imaging lens 204 is f, the second angle detection unit 352B calculates the second angle β using the following expression.

$$\beta=\arctan(pu/f) \quad \text{[Expression 3]}$$

The deviation amount calculation unit 352C illustrated in FIG. 7 calculates the amount of deviation D2 of the reinforcing bar 2 which is the measurement target with respect to the distance (first distance D1) to the white board 100 measured by the laser distance meter 234 in the imaging direction of the camera 200.

In a case in which the distance between the optical axis of the camera 200 and the reinforcing bar 2 in the real space is L as illustrated in FIG. 10, the following expression is established from the first angle α and the second angle β.

$$L=D2 \cdot \tan(90°-\alpha)$$

$$L=(D1+D2)\cdot\tan\beta \quad \text{[Expression 4]}$$

D2 can be represented by the following expression from [Expression 4].

$$D2=D1\cdot\tan\beta/\{\tan(90°-\alpha)-\tan\beta\} \quad \text{[Expression 5]}$$

The deviation amount calculation unit 352C calculates the amount of deviation D2 using [Expression 4], on the basis of the first distance D1 measured by the laser distance meter 234, the first angle α detected by the first angle detection unit 350, and the second angle β detected by the second angle detection unit 352B.

The amount of deviation D2 illustrated in FIG. 10 is the amount of deviation of the reinforcing bar 2 which is located at a position deeper than the position of the white board 100 measured by the laser distance meter 234 in a depth direction (a direction in which the distance from the distance camera 200 increases). The amount of deviation of the reinforcing bar (not illustrated) that is closer to the camera 200 than the position of the white board 100 in a direction toward the camera 200 (a direction in which the distance from the distance camera 200 decreases) can be calculated by the same method as described above.

The diameter calculation unit 352D illustrated in FIG. 7 calculates the diameter of the reinforcing bar 2 which is the measurement target on the basis of the first distance D1 to the white board 100 measured by the laser distance meter 234, the amount of deviation D2 calculated by the deviation amount calculation unit, the magnitude of the diameter of the reinforcing bar 2 which is the measurement target on the image sensor, and the focal length of the imaging lens.

Figure 11:
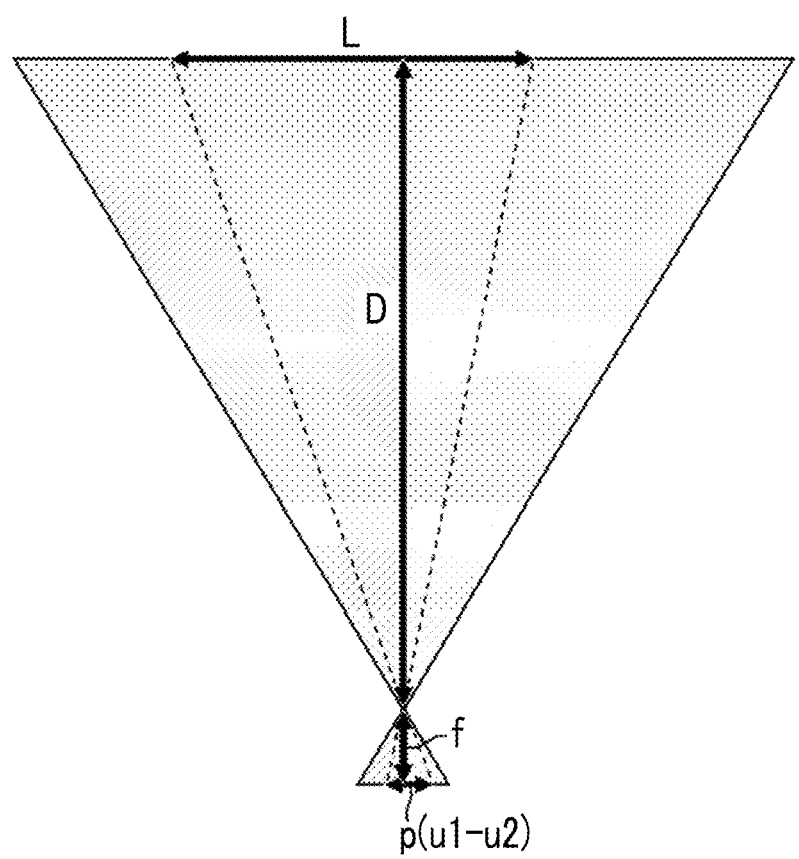
FIG. 11 is a diagram illustrating a method for measuring the length between two points of a measurement target in a case in which the image of the measurement target is captured from the front side.

FIG. 11 is a diagram illustrating a method for measuring a length L between two points of a measurement target in a case in which the image of the measurement target is captured from the front side.

As illustrated in FIG. 11, in a case in which the distance between the camera and the measurement target is D, the pixel pitch of the image sensor 224 is p, the focal length of the imaging lens 204 is f, and the coordinates of two points of the measurement target in the image sensor 224 are u1 and u2, p(u1−u2) is a length (magnitude) on the image sensor 224 which corresponds to the length L between the two points of the measurement target and L, D, p(u1−u2), and f satisfy the following relationship: L:D=p(u1−u2):f. Therefore, the length L between the two points of the measurement target can be calculated by the following expression:

$$L = D \cdot p(u1-u2)/f.$$  [Expression 6]

The diameter calculation unit 352D calculates the diameter of the reinforcing bar 2 which is the measurement target using [Expression 6] for calculating the length L between two points of the measurement target. Here, a second distance (D1+D2) obtained by adding the amount of deviation D2 to the first distance D1 is used instead of the distance D in [Expression 6]. In addition, a diameter $\phi$ of the reinforcing bar (a space between the outlines of the reinforcing bar) on the image sensor 224 is used as the length (magnitude) p(u1−u2) between two points on the image sensor 224.

Therefore, in a case in which the diameter of the reinforcing bar 2 is $\Phi$, the diameter calculation unit 352D calculates the diameter $\Phi$ using the following expression corresponding to [Expression 6]:

$$\Phi = (D1+D2) \cdot \phi/f.$$ [Expression 7]

The reinforcing bar 2 has a substantially cylindrical shape and is not seen to be thin in the image depending on the viewing angle (first angle $\alpha$). Therefore, the amount of deviation D2 is added to the first distance D1 measured by the laser distance meter 234 to correct the distance as illustrated in [Expression 7], but correction based on the first angle $\alpha$ is not performed. As a result, it is possible to calculate the diameter of the reinforcing bar 2 with high accuracy.

The space calculation unit 352E illustrated in FIG. 7 calculates the space S between the reinforcing bars using the following expression, on the basis of the first distance D1 to the white board 100 measured by the laser distance meter 234, the average amount of deviation D3 of two adjacent reinforcing bars 2, and the first angle $\alpha$ detected by the first angle detection unit 350.

$$S = (D1+D3) \cdot s/(f \cdot \cos \alpha)$$ [Expression 8]

Here, in [Expression 8], s is a space between two reinforcing bars 2 on the image sensor 224. In addition, the average amount of deviation D3 of two reinforcing bars 2 is obtained by calculating the amounts of deviation D2 of every two reinforcing bars 2 as described with reference to FIG. 10 and averaging the amounts of deviation D2 calculated for each reinforcing bar. The space S between the reinforcing bars 2 is sufficiently less than an imaging distance (first distance D1). Therefore, as illustrated in [Expression 8], 1/cos $\alpha$ is multiplied to correct the space s that is seen to be small on the image sensor 224 due to the first angle $\alpha$.

In a case in which the first angle $\alpha$ detected by the first angle detection unit 350 is 0 degrees (that is, in a case in which the image of two reinforcing bars 2 is captured from the front side), cos $\alpha$=1 and D3=0 are established. Therefore, [Expression 8] is the same as [Expression 6] for calculating the length L between two points of the measurement target.

[Object Measurement]

Figure 12:
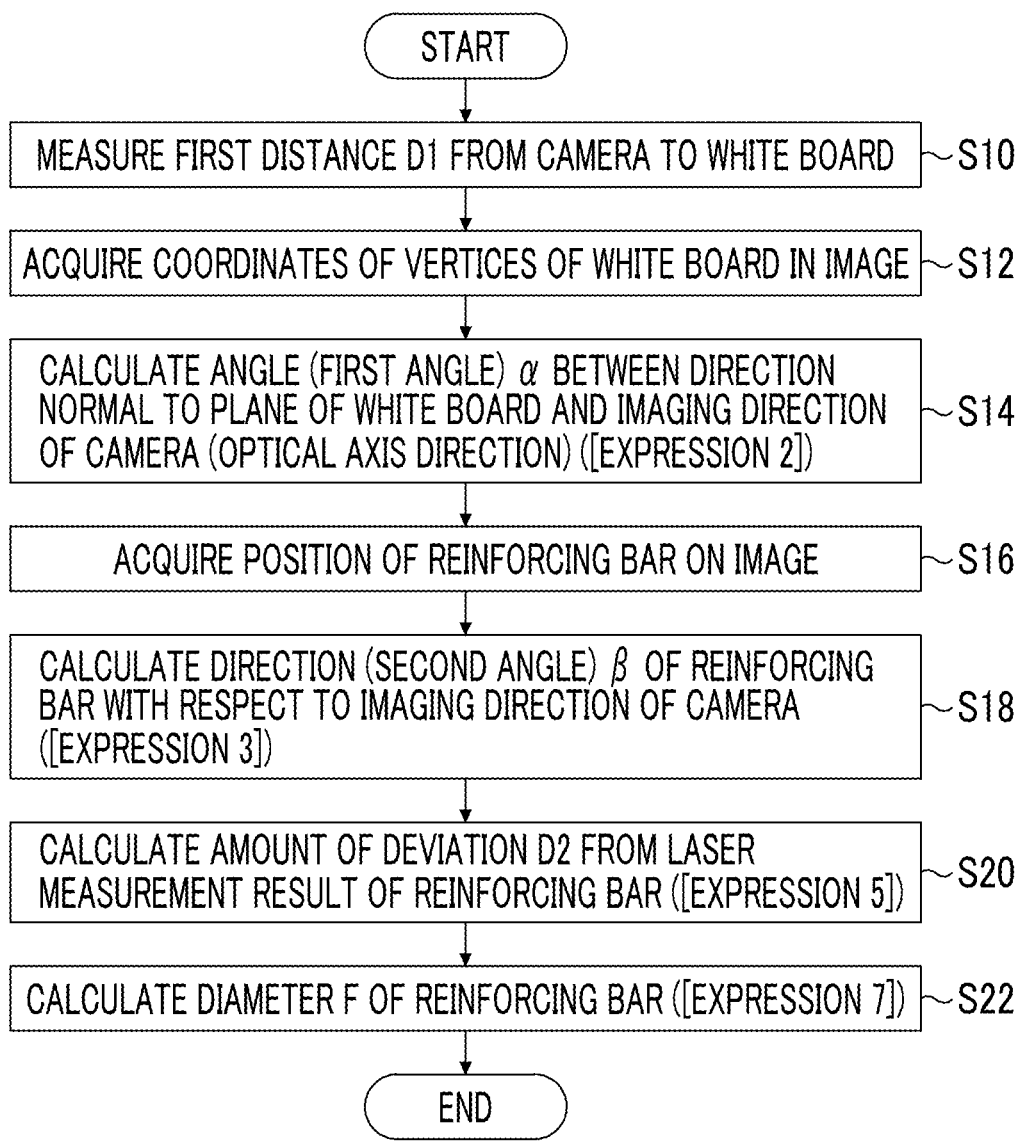
FIG. 12 is a flowchart illustrating an embodiment of an object measurement method according to the invention.

FIG. 12 is a flowchart illustrating an embodiment of an object measurement method according to the invention.

The object measurement method illustrated in FIG. 12 relates to a method for measuring the diameter of the object (reinforcing bar) to be measured by the object measurement apparatus 10. Reinforcing bar diameter measurement is performed for a plurality of reinforcing bars arranged on the same surface. In the case of the reinforcing bar assembly 1 having a rectangular prism shape as illustrated in FIG. 1, the measurement target is a plurality of reinforcing bars arranged on one surface.

<<Setting of White Board>>

First, the white board 100 is set. The white board 100 is disposed at a fixed position with respect to the reinforcing bars which are the measurement target. In this example, the white board 100 is disposed so as to come into close contact with the reinforcing bars which are the measurement target and to be parallel to the plane in which the reinforcing bars are arranged. Therefore, it is possible to specify the imaging direction from the image, without performing a special correction process, and to calculate the diameter of the reinforcing bars and the space between the reinforcing bars.

In a case in which the measurement of the reinforcing bar is performed as a part of the bar arrangement inspection, information required for the inspection is written on the white board 100.

<<Imaging>>

Then, the image of the reinforcing bars and the white board 100 is captured. Imaging is performed such that the reinforcing bars which are the measurement target and the white board 100 are included in one screen.

First, the user who is a photographer adjusts framing such that the white board 100 and the reinforcing bars which are the measurement target are included in one screen. In this case, the imaging direction may be any direction.

The user who is a photographer uses the operation unit 212 of the camera 200 to operate the laser distance meter 234 such that the first distance D1 from the camera 200 to the white board 100 is measured. The computer 300 (measurement unit 352) acquires the first distance D1 measured by the laser distance meter 234 (Step S10 in FIG. 12).

Then, a main imaging operation is performed. The imaging operation is performed by pressing the shutter button 214 of the camera 200 halfway and then pressing the shutter button 214 fully. In a case in which the shutter button 214 is pressed halfway, the camera 200 performs focusing and photometry. In a case in which the shutter button 214 is pressed fully, the main imaging operation (that is, an imaging operation for recording) is performed on the basis of the result of the photometry.

Image data obtained by the imaging operation is temporarily stored in a memory of a microcomputer forming the camera control unit 240. It is preferable that the measurement of the first distance D1 by the laser distance meter 234 and the main imaging operation are performed at the same time.

In a case in which the image data is recorded on the memory card 242, the camera control unit 240 records the image data obtained by the imaging operation and information of the distance measured by the laser distance meter 234 on the memory card 242 so as to be associated with each other.

<<Measurement>>

Then, the diameter of the reinforcing bar is measured on the basis of the obtained image data and first distance D1. The measurement is performed by the computer 300.

<Acquisition of Image Data>

First, the computer 300 (measurement unit 352) acquires the image data obtained by the imaging operation from the camera 200. At the same time, the measurement unit 352 acquires various kinds of information required for measurement from the camera 200. The information required for measurement includes information of the first distance D1 measured by the laser distance meter 234, information of the focal length f of the imaging lens 204, and information of the pixel pitch p of the image sensor 224.

The transmission of the image data and various kinds of information required for measurement to the computer 300 is performed by connecting the camera 200 and the computer 300 such that they can communicate with each other. In this example, the camera 200 and the computer 300 are connected to each other by a wireless LAN and the image data obtained by the imaging operation and the information required for measurement are transmitted from the camera 200 to the computer 300.

In addition, the camera 200 and the computer 300 may be connected to each other in a wired manner with the external connection terminal 216 provided in the camera 200 and the external connection terminal 306 provided in the computer 300 and the image data obtained by the imaging operation and the information required for measurement may be transmitted from the camera 200 to the computer 300.

<Detection of First Angle α>

Next, the computer 300 (first angle detection unit 350) detects the first angle α formed between the direction normal to the plane of the white board 100 and the imaging direction of the camera 200 on the basis of the image obtained by the imaging operation.

The computer 300 acquires the position coordinates of four vertices (feature points) which are four corners of the white board 100 on the image (image sensor 224) from the image (Step S12 in FIG. 12).

Then, the computer 300 calculates the normal vector n (n=a, b, c) to the plane of the white board 100 from the coordinates of the four vertices of the white board 100 and the relative positional relationship between the four vertices in the real space and calculates the first angle α from the calculated normal vector n (n=a, b, c) using [Expression 2] (Step S14).

Then, the computer 300 acquires the position (coordinate u) of the reinforcing bar which is the measurement target on the image (Step S16).

Then, the computer 300 (second angle detection unit 352B) calculates the angle (second angle β) indicating the direction of the reinforcing bar with respect to the imaging direction (optical axis direction) of the camera 200 using [Expression 3], on the basis of the coordinate u of the reinforcing bar on the image calculated in Step S16, the pixel pitch p of the image sensor 224, and the focal length f of the imaging lens 204 (Step S18).

Then, the computer 300 (deviation amount calculation unit 352C) calculates the amount of deviation D2 (the amount of deviation in the imaging direction of the camera 200) from the laser measurement result (first distance D1) of the reinforcing bar which is the measurement target using [Expression 5], on the basis of the first distance D1, the first angle α, and the second angle β, (Step S20).

The computer 300 (diameter calculation unit 352D) calculates the diameter Φ of the reinforcing bar using [Expression 7], on the basis of the first distance D1 measured in Step S10, the amount of deviation D2 calculated in Step S20, the diameter φ of the reinforcing bar (the space between the outlines of the reinforcing bar) on the image sensor 224, and the focal length f of the imaging lens 204 (Step S22).

The measurement results are displayed on the touch panel display 302 of the computer 300. Therefore, the user sees the information displayed on the touch panel display 302 to check the measurement results. In addition, the measurement results and the captured image are recorded on the non-volatile memory 316 of the computer 300.

As described above, according to the object measurement method of this embodiment, it is possible to measure the diameter of the reinforcing bar with high accuracy, regardless of the imaging direction of the camera 200, only by capturing the image of the white board 100 and the reinforcing bar on one screen using the camera 200 and measuring the distance from the camera 200 to the white board 100 using the laser distance meter 234 provided in the camera 200. The white board 100 is required for measurement. The white board 100 is generally used in a bar arrangement inspection site and it is possible to easily acquire the white board 100. Therefore, it is possible to perform the measurement without preparing for, for example, an image. As a result, it is possible to achieve measurement with high versatility.

In this example, the white board 100 is used as the measurement reference member. However, a rectangular black board may be used. In this case, it is possible to perform the same measurement.

Application Examples

<<Object Inspection System>>

The object measurement apparatus 10 according to the invention can be used to inspect bar arrangement which is one of the measurement targets. The bar arrangement inspection is to inspect whether the installed reinforcing bars are arranged according to a bar arrangement drawing.

Figure 13:
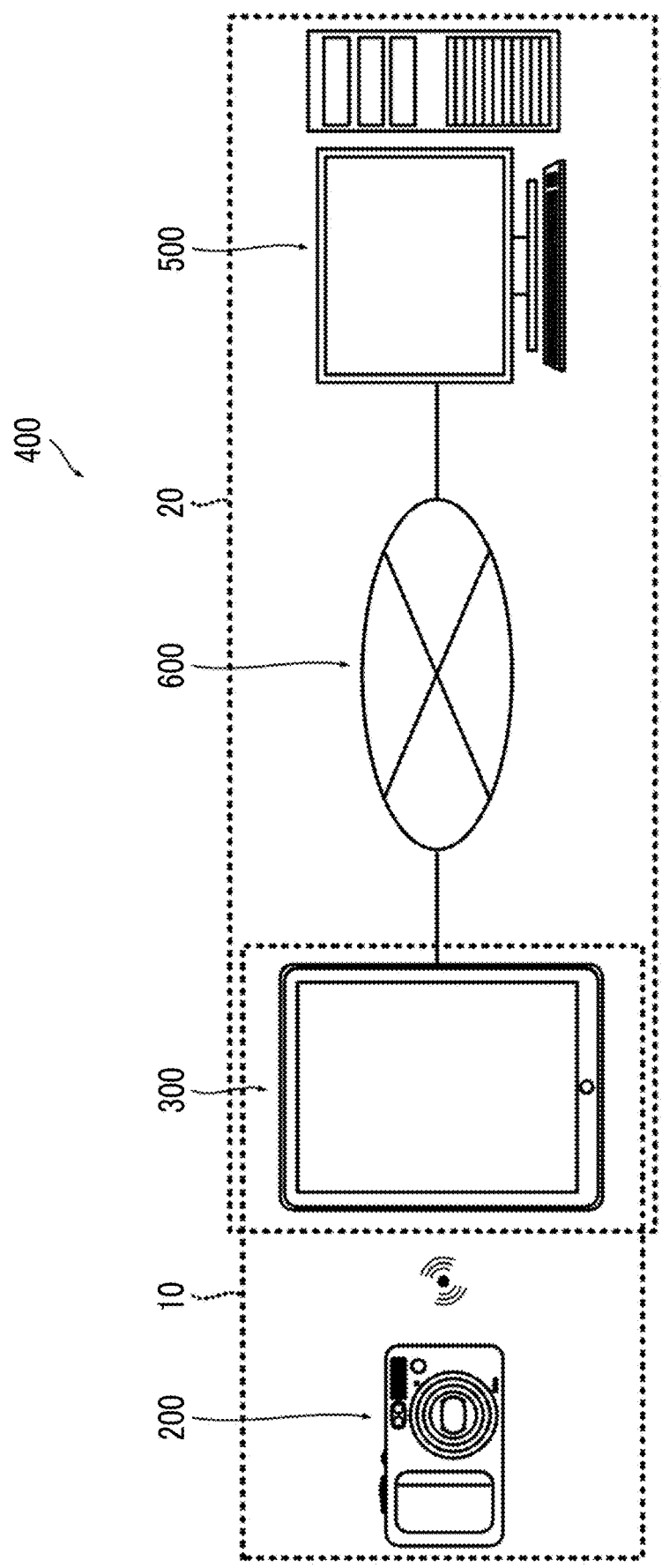
FIG. 13 is a diagram illustrating an example of the configuration of an object inspection system using the object measurement apparatus according to the invention.

FIG. 13 is a diagram illustrating an example of the configuration of an object inspection system using the object measurement apparatus according to the invention.

An object inspection system 400 includes the camera 200 having the laser distance meter, the tablet computer 300, and a management server 500. The computer 300 and the camera 200 form the object measurement apparatus 10. In addition, the computer 300 and the management server 500 form an object inspection apparatus 20. Since the configuration and operation of the object measurement apparatus 10 have been described above, the configuration and operation of the object inspection apparatus 20 will be described here.

The object inspection apparatus 20 inspects whether the reinforcing bars are installed according to the bar arrangement drawings, on the basis of the measurement result of the object measurement apparatus 10. That is, the object inspection apparatus 20 inspects whether the reinforcing bars with a diameter designated by the bar arrangement drawing are used and inspects whether the reinforcing bars are installed at an interval designated by the bar arrangement drawing.

The management server 500 is a general-purpose computer with a communication function and is connected to the tablet computer 300 through a network 600 such that it can communicate with the tablet computer 300. The management server 500 includes a display as display means, a hard disk drive as storage means, and a mouse and a keyboard as input means. The computer forming the management server 500 executes a predetermined management program to implement a function of providing and managing information required for the bar arrangement inspection.

A management database is stored in the hard disk drive of the management server 500. Information required for the bar arrangement inspection, such as the bar arrangement drawing, is stored for each inspection target in the management database. In addition, the inspection results are stored so as to be associated with an inspection target.

The computer 300 acquires information required to inspect the arrangement of the reinforcing bars which are the inspection target as bar arrangement information from the management server 500. The bar arrangement information includes at least information of the diameter of the reinforcing bars which are the inspection target and information of the space between the reinforcing bars.

The computer 300 executes a predetermined bar arrangement inspection program to function as a bar arrangement inspection unit.

Figure 14:
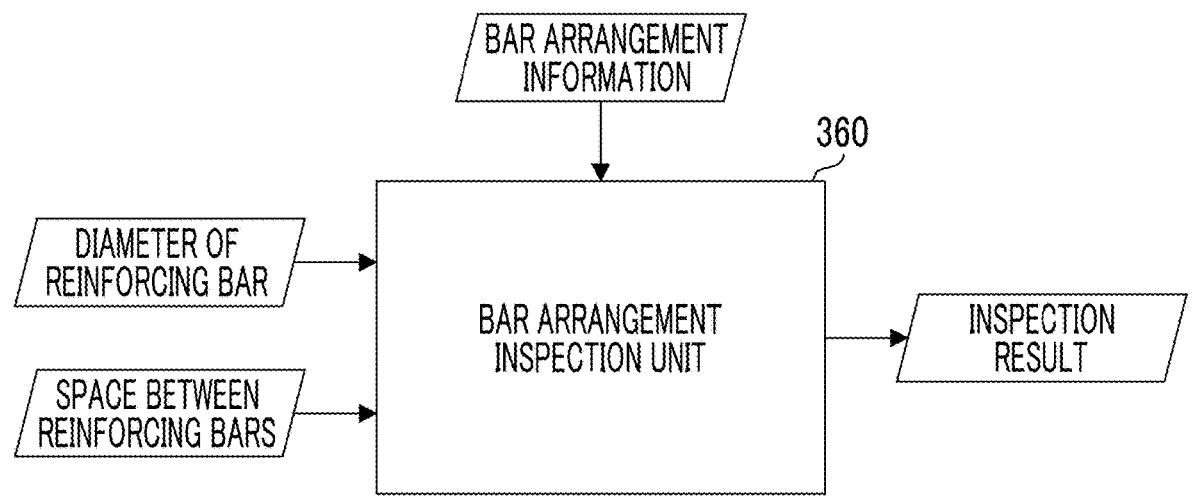
FIG. 14 is a functional block diagram illustrating a computer that functions as an object inspection unit.

FIG. 14 is a functional block diagram illustrating the computer functioning as the bar arrangement inspection unit.

A bar arrangement inspection unit 360 inspects whether the reinforcing bars which are the inspection target are installed according to the bar arrangement drawing, on the basis of the bar arrangement information acquired from the management server 500, the results of bar arrangement measurement (object measurement in a case in which the object is bar arrangement). That is, the bar arrangement inspection unit 360 inspects whether the measured diameter is equal to the diameter designated by the bar arrangement drawing and whether the measured space between the reinforcing bars is equal to the space designated by the bar arrangement drawing.

The inspection results are displayed on the touch panel display 302 of the computer 300. In addition, the inspection results are transmitted to the management server 500. The management server 500 stores the obtained inspection results in the management database.

As such, the object measurement apparatus 10 according to the invention can be used for bar arrangement inspection.

Modification Examples

<<Other Examples of Measurement Reference Member>>

In the above-described embodiment, the example in which a rectangular white board is used as the measurement reference member has been described. However, the member that can be used as the measurement reference member is not limited thereto. Any member may be used as the measurement reference member as long as it has a predetermined measurement reference. Here, examples of the measurement reference member include a member which has a plane and in which a direction normal to the plane can be calculated from the shape of the member and a captured image, a member having a parallelogram shape, a regular polygon shape, or a perfect circle shape, figures, members other than figures, points forming a parallelogram or a regular polygon, and outlines forming a parallelogram and a regular polygon. Next, other examples of the measurement reference member will be described.

(A) Plate-Shaped Member Having Parallelogram Shape, Regular Polygon Shape, or Perfect Circle Shape as Outer Shape A plate-shaped member having a parallelogram shape, a regular polygon shape, or a perfect circle shape as an outer shape can be used as the measurement reference member. In this case, the outline of the plate-shaped member forms the measurement reference.

Figure 15C:
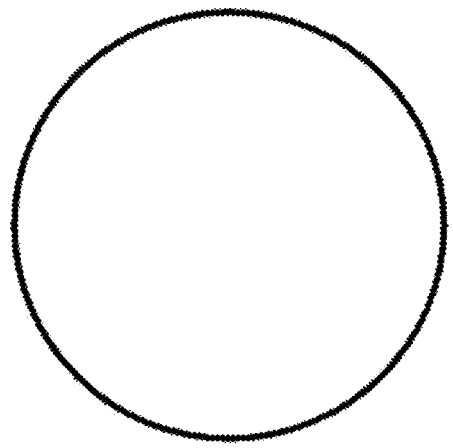
FIGS. 15A to 15C are diagrams illustrating examples of a measurement reference member which is a plate-shaped member.
Figure 15B:
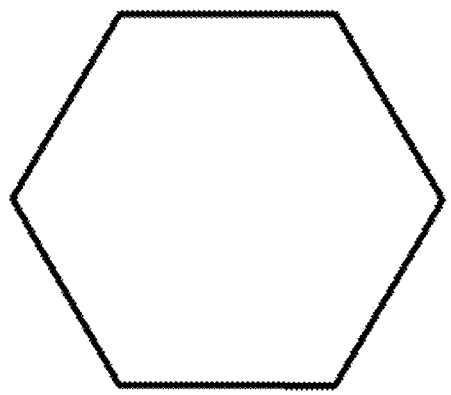
Figure 15A:
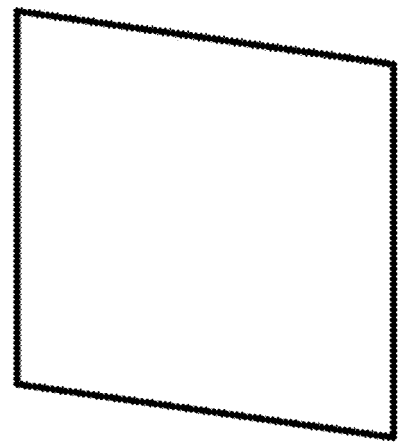

FIGS. 15A to 15C are diagrams illustrating examples of the measurement reference member which is the plate-shaped member.

FIG. 15A is a front view illustrating an example of a case in which a flat plate with a parallelogram shape is used as the measurement reference member. In a case in which a flat plate with a parallelogram shape is used as the measurement reference member as illustrated in FIG. 15A, the parallelogram forming the outline of the flat plate forms the measurement reference.

FIG. 15B is a front view illustrating an example of a case in which a flat plate with a regular polygon shape is used as the measurement reference member. In particular, a case in which a flat plate with a regular hexagon shape is used as the measurement reference member is illustrated in FIG. 15B. In a case in which a flat plate with a regular polygon shape is used as the measurement reference member as illustrated in FIG. 15B, the regular polygon forming the outline of the flat plate forms the measurement reference.

FIG. 15C is a front view illustrating an example of a case in which a circular plate with a perfect circle shape is used as the measurement reference member. In a case in which a circular plate with a perfect circle shape is used as the measurement reference member as illustrated in FIG. 15C, the perfect circle forming the outline of the circular plate forms the measurement reference.

As such, the plate-shaped member having a parallelogram shape, a regular polygon shape, or a perfect circle shape as an outer shape can be used as the measurement reference member having a predetermined measurement reference. The white board and the black board are examples of the plate-shaped member.

(B) Plate-Shaped Member or Three-Dimensional Member Having Pattern Forming Parallelogram, Regular Polygon, or Perfect Circle on Plane A plate-shaped member or a three-dimensional member having a pattern forming the measurement reference on the plane can be used as the measurement reference member. For example, a flat plate having a parallelogram, a regular polygon or a perfect circle drawn thereon can be used as the measurement reference member. In this case, a diagram of a parallelogram, a regular polygon, or a perfect circle drawn on the flat plate forms the measurement reference. The pattern forming the measurement reference is not limited to a line drawing. As described above, the imaging direction can be specified from the position of the vertex. Therefore, points indicating the position of the vertices of a parallelogram or a regular polygon may be drawn on the flat plate and may be used as the measurement reference. Similarly, the measurement reference may be formed for a pattern in which colors are classified so as to form a parallelogram, a regular polygon, or a perfect circle.

(C) Tablet Computer

A tablet computer having a flat-plate-shaped housing can also be used as the measurement reference member. For example, in a case in which the housing has a rectangular shape as the outer shape, the outline of the housing can be used as the measurement reference. In addition, for a tablet computer provided with a display, a pattern (a diagram of a parallelogram, a regular polygon, or a perfect circle or points indicating the position of the vertices of a parallelogram or a regular polygon) forming the measurement reference is displayed on the display and the pattern can be used as the measurement reference. Furthermore, in a case in which the display has a rectangular shape, the outline of the display can be used as the measurement reference.

<<Another Example of Distance Acquisition Unit>>

In the above-described embodiment, the laser distance meter provided in the camera is used as the distance acquisition unit that acquires the distance between the camera and the measurement reference member. However, the distance meter provided in the camera is not limited thereto. For example, a distance meter that measures the distance using infrared rays may be used.

In a case in which the measurement reference member in which the length L between two points are known is used, it is possible to calculate the distance D between the camera and the measurement reference member on the basis of the length L, the length p(u1−u2) on the image sensor which corresponds to the length L, and the focal length f of the imaging lens as illustrated in [Expression 6].

<<Another Example of Camera>>

In the above-described embodiment, the camera used for measurement is a so-called compact camera. However, the configuration of the camera used for measurement is not particularly limited. Therefore, a camera provided in a portable information terminal, such as a mobile phone, a smart phone, or a personal digital assistant (PDA), may be used for measurement. In the above-described embodiment, since the tablet computer is provided with a camera (built-in camera), the camera provided in the tablet computer may be used to capture images required for measurement. However, in this case, the distance meter is provided in the tablet computer.

<<Another Example of Configuration of Object Measurement Apparatus>>

In the above-described embodiment, the camera captures the image required for measurement and the computer processes the obtained image and measures the diameter of the reinforcing bars and the space between the reinforcing bars. However, the camera may process the image captured by the camera and measure the diameter of the reinforcing bars and the space between the reinforcing bars. That is, the camera may have the functions of the computer.

As described above, the computer may include the camera and the distance meter and the computer may capture an image and measure the distance.

The imaging lens provided in the camera may be a zoom lens. In this case, the camera includes focal length detection means for detecting the focal length.

<<Another Example of Object as Measurement Target>>

Figure 16:
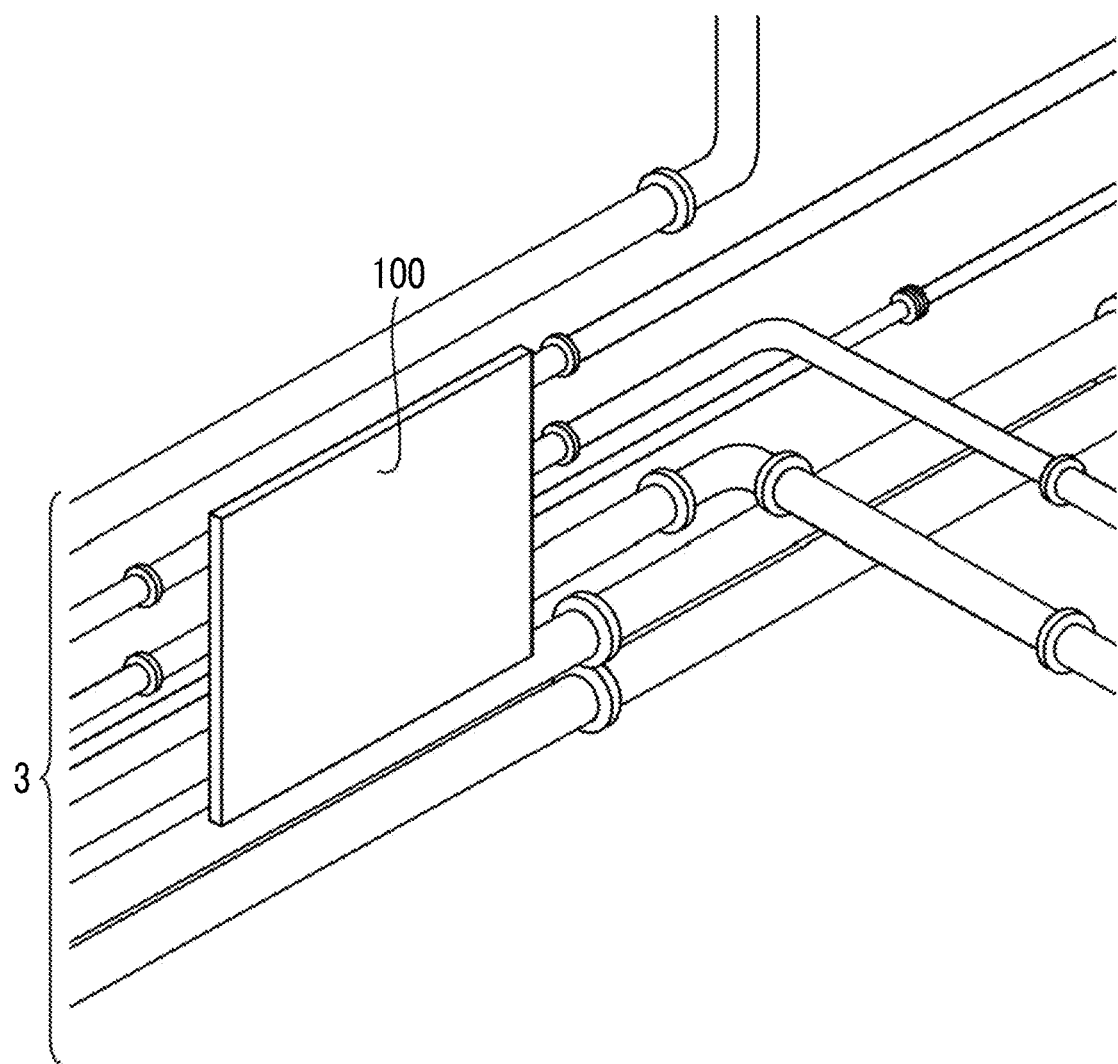
FIG. 16 is a perspective view illustrating pipes which are another embodiment of the measurement target and a white board as the measurement reference member.
Figure 17:
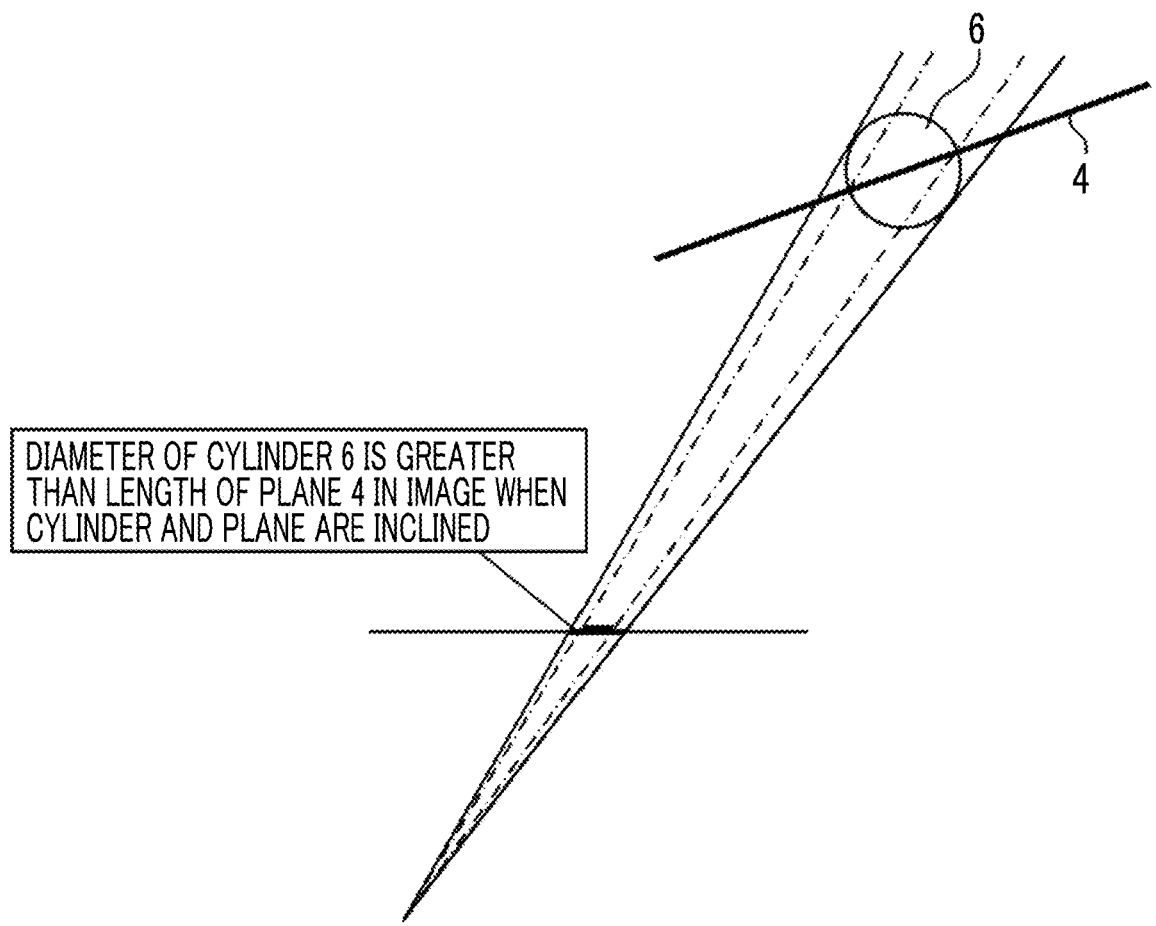
FIG. 17 is a diagram illustrating a problem that arises in a case in which an image of a plane and a cylinder is captured with the plane and the cylinder inclined.

FIG. 16 is a perspective view illustrating pipes which are another embodiment of the measurement target and a white board as the measurement reference member.

That is, the object which is the measurement target is not limited to the bar arrangement described in the above-mentioned embodiment and may be pipes 3 or wires that are installed in, for example, plants as illustrated in FIG. 16. That is, any object may be used as the measurement target as long as it has a columnar shape or a cylindrical shape. However, a plurality of objects (a plurality of pipes in the example illustrated in FIG. 16) which are the measurement target need to be arranged on the same surface. The measurement reference member (a white board 100 in the example illustrated in FIG. 16) is disposed along the plurality of objects.

EXPLANATION OF REFERENCES

1: reinforcing bar assembly
2: reinforcing bar
3: pipe
10: object measurement apparatus
100: white board
200: camera
204: imaging lens
224: image sensor
234: laser distance meter
300: computer
302: touch panel display
310: CPU
326: display unit
350: first angle detection unit
352: measurement unit
352A: reinforcing bar extraction unit
352B: second angle detection unit
352C: deviation amount calculation unit
352D: diameter calculation unit
352E: space calculation unit

What is claimed is:

1. An object measurement apparatus that measures at least a diameter of a plurality of columnar or cylindrical objects, which are arranged on the same surface, of the diameter and a space between the plurality of objects, the apparatus comprising:

a camera including an imaging lens and an image sensor;

a distance acquisition unit that acquires a first distance between the camera and a measurement reference member which has a plane disposed along the plurality of objects;

a first angle detection unit that detects a first angle formed between a direction normal to the plane of the measurement reference member and an imaging direction of the camera;

a second angle detection unit that detects a second angle indicating a direction of an object which is a measurement target with respect to the imaging direction of the camera, on the basis of a position of the object which is the measurement target on the image sensor and a focal length of the imaging lens;

a deviation amount calculation unit that calculates an amount of deviation of the object which is the measurement target with respect to the first distance in the imaging direction of the camera, on the basis of the first distance acquired by the distance acquisition unit, the first angle detected by the first angle detection unit, and the second angle detected by the second angle detection unit; and a diameter calculation unit that calculates the diameter of the object which is the measurement target, on the basis of a second distance obtained by adding the amount of deviation calculated by the deviation amount calculation unit to the first distance acquired by the distance acquisition unit, a magnitude of the diameter of the object which is the measurement target on the image sensor, and the focal length of the imaging lens.

2. The object measurement apparatus according to claim 1, wherein the distance acquisition unit is a distance meter provided in the camera.

3. The object measurement apparatus according to claim 2, wherein the distance meter is a laser distance meter.

4. The object measurement apparatus according to claim 1, wherein the distance acquisition unit calculates the first distance on the basis of a known size specified by the measurement reference member, a size on the image sensor which corresponds to the known size, the focal length of the imaging lens, and the first angle detected by the first angle detection unit.

5. The object measurement apparatus according to claim 1, wherein the measurement reference member is a plate-shaped member that has a parallelogram shape, a regular polygon shape, or a perfect circle shape as an outer shape.

6. The object measurement apparatus according to claim 1, wherein the measurement reference member is a black board or a white board for construction.

7. The object measurement apparatus according to claim 1, wherein the first angle detection unit detects the first angle on the basis of position coordinates of a plurality of feature points of the measurement reference member on the image sensor and a relative positional relationship between the plurality of feature points of the measurement reference member in a real space.

8. The object measurement apparatus according to claim 1, wherein, in a case in which the first distance is D1, the amount of deviation is D2, the first angle is α, and the second angle is β, the deviation amount calculation unit calculates the amount of deviation D2 using the following expression:

$$D2=D1 \cdot \tan \beta / \{\tan(90°-\alpha)-\tan \beta\}.$$

9. The object measurement apparatus according to claim 1, wherein, in a case in which the first distance is D1, the amount of deviation is D2, a magnitude of the diameter of the object which is the measurement target on the image sensor is φ, the focal length of the imaging lens is f, and the diameter of the object which is the measurement target is Φ, the diameter calculation unit calculates the diameter Φ of the object using the following expression:

$$\Phi=(D1+D2) \cdot \phi/f.$$

10. The object measurement apparatus according to claim 1, wherein the deviation amount calculation unit calculates an amount of deviation of two objects, between which a space is to be measured, with respect to the first distance in the imaging direction of the camera on the basis of the first distance acquired by the distance acquisition unit, the first angle detected by the first angle detection unit, and the second angle of each of the two objects detected by the second angle detection unit, and the object measurement apparatus further comprises a space calculation unit that calculates the space between the two objects on the basis of the first distance, the amount of deviation of the two objects, the first angle, the focal length of the imaging lens, and a space between the two objects on the image sensor.

11. The object measurement apparatus according to claim 10, wherein, in a case in which the first distance is D1, an average amount of deviation of the two objects is D3, the first angle is α, the focal length of the imaging lens is f, the space between two objects on the image sensor is s, and the space between two objects is S, the space calculation unit calculates the space S between the two objects using the following expression:

$$S=(D1+D3) \cdot s/(f \cos \alpha).$$

12. The object measurement apparatus according to claim 1, further comprising:
a computer that is communicable with the camera,
wherein the computer receives, from the camera, an image which is captured by the camera in a state in which at least the measurement reference member is included in one screen and functions as the first angle detection unit, the deviation amount calculation unit, and the diameter calculation unit.

13. The object measurement apparatus according to claim 12, wherein the computer further comprises a display unit that displays the image captured by the camera.

14. An object measurement method that measures at least a diameter of a plurality of columnar or cylindrical objects, which are arranged on the same surface, of the diameter and a space between the plurality of objects, the method comprising:
a step of capturing an image of the plurality of objects and a measurement reference member that has a plane disposed along the plurality of objects at the same time using a camera comprising an imaging lens and an image sensor;
a step of acquiring a first distance between the camera and the measurement reference member;
a step of detecting a first angle formed between a direction normal to the plane of the measurement reference member and an imaging direction of the camera on the basis of the captured image;
a step of detecting a second angle indicating a direction of an object which is a measurement target with respect to the imaging direction of the camera, on the basis of a position of the object which is the measurement target on the image sensor and a focal length of the imaging lens;
a step of calculating an amount of deviation of the object which is the measurement target with respect to the first distance in the imaging direction of the camera, on the basis of the acquired first distance, the detected first angle, and the detected second angle; and
a step of calculating the diameter of the object which is the measurement target, on the basis of a second distance obtained by adding the calculated amount of deviation to the acquired first distance, a magnitude of the diameter of the object which is the measurement target on the image sensor, and the focal length of the imaging lens.

* * * * *